United States Patent
Kamada

(10) Patent No.: US 9,346,968 B2
(45) Date of Patent: May 24, 2016

(54) INK COMPOSITION, INK SET, AND IMAGE FORMING METHOD

(71) Applicant: FUJIFILM CORPORATION, Minato-ku, Tokyo (JP)

(72) Inventor: Toshihiro Kamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/640,030

(22) Filed: Mar. 6, 2015

(65) Prior Publication Data

US 2015/0175819 A1    Jun. 25, 2015

Related U.S. Application Data

(63) Continuation of application No. PCT/JP2013/074763, filed on Sep. 12, 2013.

(30) Foreign Application Priority Data

Sep. 27, 2012    (JP) ................. 2012-214657

(51) Int. Cl.
| | |
|---|---|
| *G01D 11/00* | (2006.01) |
| *C09D 11/033* | (2014.01) |
| *C09D 11/101* | (2014.01) |
| *C09D 11/30* | (2014.01) |
| *C09D 11/40* | (2014.01) |
| *C09D 11/107* | (2014.01) |
| *C09D 11/38* | (2014.01) |
| *C09D 11/54* | (2014.01) |

(52) U.S. Cl.
CPC ............ *C09D 11/033* (2013.01); *C09D 11/101* (2013.01); *C09D 11/107* (2013.01); *C09D 11/30* (2013.01); *C09D 11/38* (2013.01); *C09D 11/40* (2013.01); *C09D 11/54* (2013.01)

(58) Field of Classification Search
USPC ................................. 347/6–7, 9, 95
See application file for complete search history.

(56) References Cited

U.S. PATENT DOCUMENTS

2012/0293577 A1 * 11/2012 Kyoso .................. B41J 2/04588
                                                      347/10

FOREIGN PATENT DOCUMENTS

| JP | 2007146002 a2 * | 6/2007 |
| JP | 2010-168433 A | 8/2010 |
| JP | 2010-248357 A | 11/2010 |

(Continued)

*Primary Examiner* — Jason Uhlenhake
(74) *Attorney, Agent, or Firm* — SOLARIS Intellectual Property Group, PLLC

(57) ABSTRACT

An ink composition, including: water; a polymerizable compound; a polymerization initiator; and a β-alkoxypropionamide compound represented by the following Formula (A):

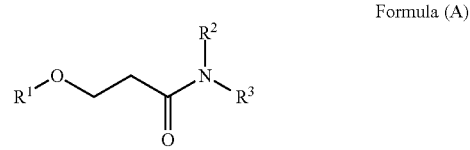

Formula (A)

wherein, in Formula (A), $R^1$ represents a linear or branched alkyl group having from 1 to 6 carbon atoms; each of $R^2$ and $R^3$ independently represents a hydrogen atom or a linear or branched alkyl group having from 1 to 4 carbon atoms; and $R^2$ and $R^3$ may be the same or different.

20 Claims, 1 Drawing Sheet

(56) References Cited

FOREIGN PATENT DOCUMENTS

| JP | 2011-068838 A | 4/2011 |
| JP | 2012-046671 A | 3/2012 |
| JP | 2012-052040 A | 3/2012 |
| JP | 2012-052041 A | 3/2012 |
| JP | 2012-052042 A | 3/2012 |
| JP | 2012-067159 A | 4/2012 |

* cited by examiner

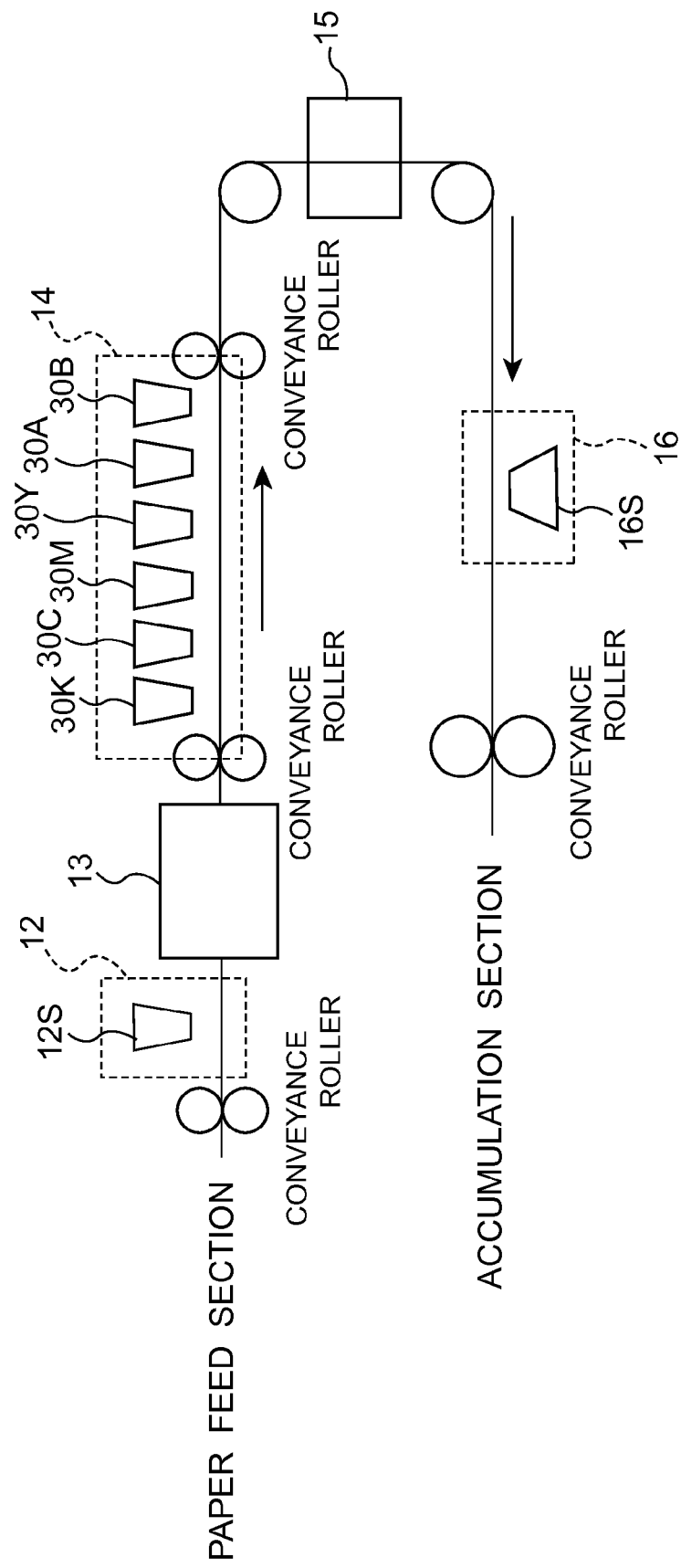

INK COMPOSITION, INK SET, AND IMAGE FORMING METHOD

CROSS-REFERENCE TO RELATED APPLICATIONS

This application is a continuation application of International Application No. PCT/JP2013/074763, filed Sep. 12, 2013, the disclosure of which is incorporated herein by reference in its entirety. Further, this application claims priority from Japanese Patent Application No. 2012-214657, filed Sep. 27, 2012, the disclosure of which is incorporated herein by reference in its entirety.

TECHNICAL FIELD

The invention relates to an ink composition, an ink set, and an image forming method.

BACKGROUND ART

Besides solvent inks, water-based inks have attracted attention form the viewpoint of giving consideration to the global environment and working conditions. A technique for forming an image having excellent abrasion resistance (that is, a scratch is hardly formed) by curing an ink that contains a polymerizable monomer has been studied.

As such an image forming technique, for example, as a non-water based ink, an active energy curable ink jet ink composition characterized in that it contains a polymerizable compound, a photopolymerization initiator, and a β-alkoxypropionamide compound having a specific structure is disclosed (for example, see Japanese Patent Application Laid-Open (JP-A) No. 2012-67159).

As a water-based ink, an ink containing a pigment and a specific amide solvent is disclosed (for example, see JP-A No. 2012-46671), and such an ink is used for performing printing on offset coated media in JP-A No. 2012-46671.

SUMMARY OF INVENTION

Technical Problem

In the water-based ink composition that includes a polymerizable compound and a polymerization initiator for polymerizing the polymerizable compound, the polymerization initiator tends to precipitate over time since the polymerization initiator is generally insoluble in water. The precipitation of the polymerization initiator is noticeable particularly in a low-temperature environment. Furthermore, the precipitation of the polymerization initiator sometimes leads to the decrease in curability of the ink composition. When the ink composition is used for ink-jet recording, the precipitation of the polymerization initiator sometimes leads to an increase in viscosity of the ink composition and therefore destabilizes the ejection of the ink composition from an ink-jet nozzle.

The invention was made in view of the above circumstances. An object of the invention is to provide an ink composition and an ink set having excellent stability over time in various temperature environments including a low-temperature environment and an image forming method by which excellent ejection stability of the ink composition is achieved. An aim of the invention is to achieve the object.

Solution to Problem

Specific means for solving the problems is as follows.
<1> An ink composition, comprising:
water;
a polymerizable compound;
a polymerization initiator; and
a β-alkoxypropionamide compound represented by the following Formula (A):

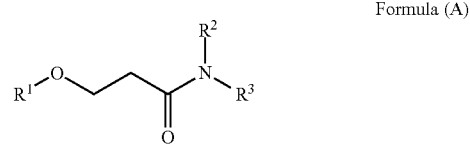

Formula (A)

wherein, in Formula (A), $R^1$ represents a linear or branched alkyl group having from 1 to 6 carbon atoms; each of $R^2$ and $R^3$ independently represents a hydrogen atom or a linear or branched alkyl group having from 1 to 4 carbon atoms; and $R^2$ and $R^3$ may be the same or different.

<2> The ink composition according to <1>, wherein a ratio (a/b) of the β-alkoxypropionamide compound (a) and the polymerization initiator (b) based on mass is from 1.7/1 to 5/1.

<3> The ink composition according to <1> or <2>, wherein a content of the β-alkoxypropionamide compound with respect to a total mass of the ink composition is from 3% by mass to 18% by mass.

<4> The ink composition according to any one of <1> to <3>, having a pH of from 8 to 9.

<5> The ink composition according to any one of <1> to <4>, further comprising a coloring agent.

<6> The ink composition according to any one of <1> to <5>, wherein a content of the water with respect to a total mass of the ink composition is from 50% by mass to 70% by mass.

<7> The ink composition according to any one of <1> to <6>, wherein the polymerizable compound is a (meth)acrylamide compound.

<8> The ink composition according to any one of <1> to <7>, further comprising a polyvalent (meth)acrylamide compound represented by the following Formula (1):

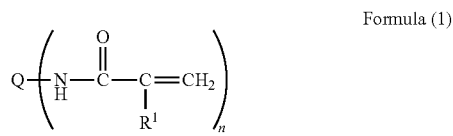

Formula (1)

wherein, in Formula (1), Q represents an n-valent linking group; $R^1$ represents a hydrogen atom or a methyl group; and n represents an integer of 2 or more.

<9> The ink composition according to any one of <1> to <8>, which is an ink jet ink.

<10> An ink set, comprising:
the ink composition according to any one of <1> to <9>; and
a treatment liquid comprising an aggregation component that forms an aggregate when brought into contact with the ink composition.

<11> An image forming method, comprising an ink applying process of applying the ink composition according to <9> to a recording medium by an ink jet method to form an image.

<12> The image forming method according to <11>, further comprising a treatment liquid applying process of applying to the recording medium a treatment liquid comprising an aggregation component that forms an aggregate when brought into contact with the ink composition.

Advantageous Effects of Invention

According to the invention, there are provided an ink composition and an ink set having excellent stability over time in various temperature environments including a low-temperature environment. In addition, according to the invention, there is provided an image forming method by which excellent ejection stability of the ink composition is achieved.

BRIEF DESCRIPTION OF DRAWING

FIG. 1 is a schematic diagram showing an example of a structure of an ink jet recording apparatus used for forming an image.

DESCRIPTION OF EMBODIMENTS

Hereinbelow, an ink composition, an ink set, and an image forming method according to the invention are described in detail.

Ink Composition

An ink composition according to the invention includes water, a polymerizable compound, a polymerization initiator, and a β-alkoxypropionamide compound represented by Formula (A). Hereinbelow, the β-alkoxypropionamide compound represented by Formula (A) is sometimes referred to as "specific amide compound".

The ink composition according to the invention may further include other components such as polymer particles, a surfactant, a water-soluble organic solvent, and/or a wetting agent if necessary.

With regard to the technique of forming an image by curing an ink composition with active energy rays, the system using a solvent-ink has been widely known. On the other hand, water-based inks have been prevailing in recent years from the viewpoints of the environment and working conditions. In a case in which the ink is prepared as the water-based ink, there is a possibility that the sufficient solubility of a polymerization initiator used for a polymerization reaction of a polymerizable monomer and the like is not maintained, as a result of which the stability of the ink and the strength of the image formed are easily deteriorated. In particular, the deterioration of the ink stability and the abrasion resistance of the image are noticeable when exposed to a low-temperature environment.

In contrast to the above, in the invention, the specific amide compound is used in combination with a polymerization initiator in a case in which the ink composition is prepared using a polymerization initiator having a relatively low solubility in water (for example, a solubility in pure water at 25° C. is 15 g/L or less). As a result, the solubility of the polymerization initiator in water is maintained regardless of the temperature environment during storage or usage. In addition, the ink composition in the invention includes the polymerizable compound, and therefore the stability over time of the ink composition is further improved compared to the conventional ones.

Hereinbelow, respective components constituting the ink composition according to the invention are described.

β-Alkoxypropionamide Compound Represented by Formula (A) (Specific Amide Compound)

The ink composition according to the invention includes at least one β-alkoxypropionamide compound represented by Formula (A) (specific amide compound).

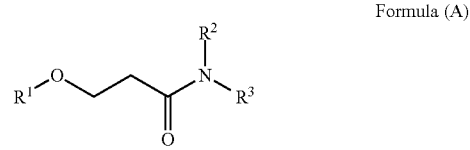

Formula (A)

In Formula (A), $R^1$ represents a linear or branched alkyl group having from 1 to 6 carbon atoms; and each of $R^2$ and $R^3$ independently represents a hydrogen atom or a linear or branched alkyl group having from 1 to 4 carbon atoms. $R^2$ and $R^3$ may be the same or different.

Since the specific amide compound can maintain the solubility of the polymerization initiator included in the ink composition and increase compatibility with water, the precipitation of the polymerization initiator can be suppressed in a case in which the ink composition is placed in a low-temperature environment. Furthermore, the ink composition is easy to handle since the specific amide compound has a reduced environmental burden and a reduced odor.

In Formula (A), examples of the linear or branched alkyl group having from 1 to 6 carbon atoms represented by $R^1$ include a methyl group, an ethyl group, a propyl group, an isopropyl group, a n-butyl group, a tert-butyl group, a n-pentyl group, and a n-hexyl group.

In Formula (A), examples of the linear or branched alkyl group having from 1 to 4 carbon atoms represented by $R^2$ and/or $R^3$ include a methyl group, an ethyl group, a propyl group, an isopropyl group, a n-butyl group, and a tert-butyl group.

Among these, the alkyl group represented by $R^1$ is preferably an alkyl group having from 3 to 6 carbon atoms, and more preferably a propyl group, an isopropyl group, a n-butyl group, a tert-butyl group, a n-pentyl group, or a n-hexyl group.

The alkyl group represented by $R^2$ and/or $R^3$ is preferably an alkyl group having from 1 to 3 carbon atoms, and more preferably a methyl group or an ethyl group.

Hereinbelow, exemplified compounds A-1 to A-33 of the specific amide compounds are shown, but the specific amide compound is not limited to these.

A-1: 3-methoxy-N,N-dimethylpropionamide
A-2: 3-n-butoxy-N,N-dimethylpropionamide
A-3: 3-ethoxy-N,N-diethylpropionamide
A-4: 3-methoxy-N,N-diethylpropionamide
A-5: 3-methoxy-N,N-monomethylmonoethylpropionamide
A-6: 3-methoxy-N,N-di-n-propylpropionamide
A-7: 3-methoxy-N,N-di-n-butylpropionamide
A-8: 3-methoxy-N,N-di-n-butylpropionamide
A-9: 3-ethoxy-N,N-dimethylpropionamide
A-10: 3-ethoxy-N,N-monomethylmonoethylpropionamide
A-11: 3-ethoxy-N,N-di-n-propylpropionamide
A-12: 3-ethoxy-N,N-di-n-butylpropionamide
A-13: 3-n-butoxy-N,N-diethylpropionamide
A-14: 3-n-butoxy-N,N-monomethylmonoethylpropionamide
A-15: 3-n-butoxy-N,N-di-n-propylpropionamide
A-16: 3-n-butoxy-N,N-di-n-butylpropionamide
A-17: 3-n-propoxy-N,N-dimethylpropionamide A-18: 3-n-propoxy-N,N-diethylpropionamide
A-19: 3-n-propoxy-N,N-monomethylmonoethylpropionamide
A-20: 3-n-propoxy-N,N-di-n-propylpropionamide
A-21: 3-n-propoxy-N,N-di-n-butylpropionamide
A-22: 3-iso-propoxy-N,N-dimethylpropionamide
A-23: 3-iso-propoxy-N,N-diethylpropionamide
A-24: 3-iso-propoxy-N,N-monomethylmonoethylpropionamide
A-25: 3-iso-propoxy-N,N-di-n-propylpropionamide
A-26: 3-iso-propoxy-N,N-di-n-butylpropionamide
A-27: 3-tert-butoxy-N,N-dimethylpropionamide
A-28: 3-tert-butoxy-N,N-diethylpropionamide
A-29: 3-tert-butoxy-N,N-monomethylmonoethylpropionamide
A-30: 3-tert-butoxy-N,N-di-n-propylpropionamide
A-31: 3-tert-butoxy-N,N-di-n-butylpropionamide
A-32: 3-hexyloxy-N,N-dimethylpropionamide
A-33: 3-hexyloxy-N,N-diethylpropionamide The ink composition according to the invention may include one type of specific amide compound, or two or more kinds of the specific amide compounds.

More specifically, the specific amide compound can be produced, for example, based on a synthesis process described in JP-A No. 2009-185079 or International Publication (WO) No. 2008/102615. The specific amide compound to be used may be a commercially available product, and available as "Equamide" from Idemitsu Kosan Co. Ltd.

The content of the specific amide compound in the ink composition with respect to the total mass of the ink composition is preferably from 2% by mass to 20% by mass, from the viewpoints of suppressing the precipitation of the polymerization initiator in the ink composition and improving curability of the ink composition. In a case in which the content of the specific amide compound is 2% by mass or more, the solubility of the polymerization initiator in the ink composition can be further increased. In a case in which the content of the specific amide compound is 20% by mass or less, the ink composition can contain a sufficient amount of polymerizable compound, and therefore curability of the ink composition can be improved.

The content of the specific amide compound in the ink composition with respect to the total mass of the ink composition is more preferably from 3% by mass to 18% by mass, and still more preferably from 5% by mass to 15% by mass.

In the ink composition according to the invention, it is preferable to use the specific amide compound and the polymerization initiator at the following quantitative ratio. That is, provided that the total mass of the specific amide compound in the ink composition is "a" and the total mass of the polymerization initiator in the ink composition is "b", the mass ratio (a/b) of the specific amide compound to the polymerization initiator is preferably from 1/1 to 10/1, and more preferably from 1.7/1 to 5/1.

In a case in which the mass ratio of the specific amide compound to the polymerization initiator is set within the above range, the precipitation of the polymerization initiator from the ink composition can be suppressed, and the precipitation of the polymerization initiator can be suppressed even when the ink composition is placed in a low-temperature environment.

Polymerization Initiator

The ink composition according to the invention includes at least one polymerization initiator.

The type of the polymerization initiator is not particularly limited, and an excellent effect can be obtained when a polymerization initiator having low solubility in water is used in the invention. More specifically, it is preferable to use a polymerization initiator having a solubility in pure water (25° C.) of 15 g/L or less. Hereinafter, the "solubility in pure water (25° C.)" is also simply referred to as "solubility in water".

The solubility in water of the polymerization initiator having a solubility in water of 15 g/L or less can be maintained by the use of the specific amide compound, and as a result of which the precipitation of the polymerization initiator in the water-based ink is suppressed and the stability over time (in particular, stability in a low temperature region) is improved when used in the ink composition.

Since the ink composition according to the invention is a water-based ink composition including water as a solvent, it is preferable that the polymerizable compound has a certain degree of solubility in water. More specifically, it is preferable that the polymerizable compound has a solubility in water of 5 g/L or more.

The content of the polymerization initiator in the ink composition with respect to the total mass of the ink composition is preferably 1% by mass or more. The content of the polymerization initiator in the ink composition of 2% by mass or more indicates a range in which the polymerization initiator (in particular, the polymerization initiator having a solubility in water of 15 g/L or less) easily precipitates in the ink composition. Therefore, in this case, the ink composition exhibits a potent effect by the inclusion of the specific amide compound.

The content of the polymerization initiator in the ink composition with respect to the total mass of the ink composition is preferably from 1% by mass to 4% by mass, more preferably from 1% by mass to 3.5% by mass, and still more preferably from 1.5% by mass to 3% by mass.

In a case in which the content of the polymerization initiator with respect to the total mass of the ink composition is limited to 4% by mass or less, the improving effect due to the inclusion of the specific amide compound in the ink composition can be expected.

The polymerization initiator may be appropriately selected from the known polymerization initiators. Basically, the polymerization initiator may be appropriately selected from compounds capable of initiating a polymerization reaction by an active energy ray. For example, an initiator (for example, a photopolymerization initiator) that generates active species (such as a radical, an acid, or a base) on exposure to radiation or light, or an electron beam may be used.

Examples of the polymerization initiator include hydroxyalkylphenone initiators, acetophenone initiators, benzophenone initiators, benzoin or benzoin-ether initiators, aminoalkylphenone initiators, xanthone initiators, and oxime initiators.

Specific examples of the hydroxyalkylphenone initiators include 1-hydroxycyclohexyl phenyl ketone, 1-[4-(2-hydroxyethoxy)-phenyl]-2-hydroxy-2-methyl-1-propan-1-one, 2-hydroxy-2-methyl-1-phenyl-1-one, and 1-(4-isopropylphenyl)-2-hydroxy-2-methylpropan-1-one. Examples of the commercially available product of hydroxyalkylphenone initiators on the market include IRGACURE 2959 (manufactured by BASF Japan Ltd.).

Specific examples of the acetophenone initiators include acetophenone, 2,2-diethoxy acetophenone, and p-dimethylaminoacetophenone.

Specific examples of the benzophenone initiators include benzophenone, 2-chlorobenzophenone, p,p'-dichlorobenzophenone, p,p'-bisdiethylaminobenzophenone, and Michler's ketone.

Specific examples of the benzoin or benzoin-ether initiators include benzoin, benzoin methyl ether, benzoin ethyl ether, benzoin isopropyl ether, benzoin n-propyl ether, benzoin isobutyl ether, and benzoin n-butyl ether.

The polymerization initiator may be used singly, or in combination of two or more kinds thereof.

The content of the polymerization initiator in the ink composition with respect to the total mass of the polymerizable compound is preferably from 1% by mass to 40% by mass, and more preferably from 5% by mass to 30% by mass.

In a case in which the content of the polymerization initiator with respect to the polymerizable compound is 1% by mass or more, the abrasion resistance of the image is further improved, which is advantageous in high speed recording. The content of the polymerization initiator with respect to the polymerizable compound of 40% by mass or less is advantageous in terms of the ejection stability of an ink from an ink-jet nozzle when the ink composition is used as the ink jet ink.

The polymerization initiator may be used in combination with a sensitizer. Examples of the sensitizer include amine compounds (such as aliphatic amine, amine having an aromatic group, or piperidine), urea compounds (such as allyl urea or o-tolylthiourea), sulfur compounds (such as sodium diethyl dithiophosphate or a soluble salt of aromatic sulfinic acid), nitrile compounds (such as N,N di-substituted-p-aminobenzonitrile), phosphorus compounds (such as tri-n-butylphosphine or sodium diethyl dithiophosphate), nitrogen compounds (such as Michler's ketone, an N-nitrosohydroxylamine derivative, an oxazolidine compound, a tetrahydro-1, 3-oxazine compound, or a condensate of formaldehyde or acetaldehyde and diamine), chloride compounds (such as carbon tetrachloride, or hexachloro ethane), polymeric amine of a reaction product of an epoxy resin and amine, and triethanolamine triacrylate.

The sensitizer may be contained within a range in which the effects of the invention are not impaired.

Polymerizable Compound

The ink composition according to the invention includes at least one polymerizable compound.

The ink composition according to the invention is cured by the polymerization of the polymerizable compound, and thereby the image is strengthened.

The polymerizable compound is preferably a water-soluble polymerizable compound.

The term "water-soluble" as used herein refers to capability of being dissolved in water at at least a certain concentration. Specifically, solubility in water at 25° C. of 5% by mass or more is preferable, and 10% by mass or more is more preferable. The water-soluble polymerizable compound is preferably one capable of being (preferably homogeneously) dissolved in a water-based ink composition. Furthermore, the water-soluble polymerizable compound may be one (preferably homogeneously) dissolved in the ink composition due to an increase in solubility by the addition of a water-soluble organic solvent to be described below.

The polymerizable compound is not particularly limited, and may be a monofunctional polymerizable compound or a polyfunctional polymerizable compound.

The polymerizable compound is preferably a (meth)acrylamide compound. The term "(meth)acrylamide compound" as used herein means at least one of a methacrylamide compound or an acrylamide compound. The (meth)acrylamide compound is a compound having a (meth)acrylamide structure in the molecule and is polymerized by irradiation of active energy rays.

The ink composition according to the invention preferably includes, as at least one polymerizable compound, one or more polyvalent (meth)acrylamide compounds represented by the following Formula (1). In Formula (1), Q represents an n-valent linking group, $R^1$ represents a hydrogen atom or a methyl group, and n represents an integer of 2 or more.

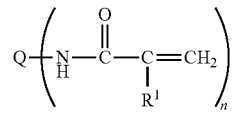

Formula (1)

In the polyvalent (meth)acrylamide compound in which n in Formula (1) is 2 or more, polymerizability and polymerization efficiency when curing the image by irradiation of active energy rays are high, and the abrasion resistance and the scratch resistance of the formed image are enhanced.

The (meth)acrylamide compound represented by Formula (1) is a compound in which an unsaturated vinyl monomer is bonded to the linking group Q via an amide bond.

$R^1$ in Formula (1) represents a hydrogen atom or a methyl group, and preferably a hydrogen atom.

The valence n of the linking group Q in Formula (1) is 2 or more, preferably from 2 to 6, and more preferably from 2 to 4, from the viewpoints of improving permeability, polymerization efficiency, and ejection stability.

In Formula (1), n represents an integer of 2 or more, and therefore Q represents a linking group having a valence of two or more.

Specific examples of the linking group Q include a substituted or unsubstituted alkylene group having 4 or less carbon atoms, such as a methylene group, an ethylene group, a propylene group, or a butylene group; a linking group having a valence of two or more and having a saturated or unsaturated heterocyclic ring (such as a pyridine ring, an imidazole ring, a pyrazine ring, a piperidine ring, a piperazine ring, or a morpholine ring); a residue of a polyol compound having a valence of two or more and containing an oxyalkylene group (preferably an oxyethylene group); and a residue of a polyol compound having a valence of two or more and containing three or more oxyalkylene groups (preferably oxyethylene groups).

Hereinafter, specific examples of the polyvalent (meth) acrylamide compound are shown. However, the invention is not limited thereto.

Polymerizable compound 1

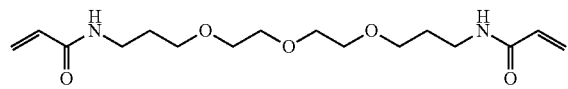

Polymerizable compound 2

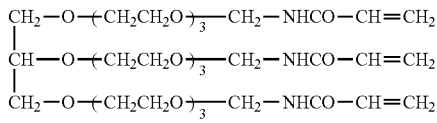

Polymerizable compound 3
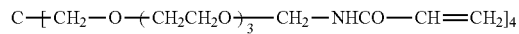
Polymerizable compound 4
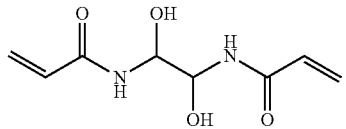
Polymerizable compound 5
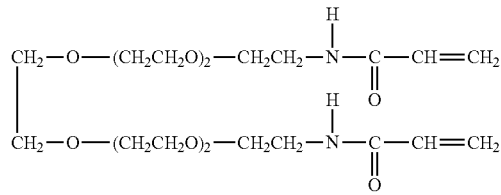
Polymerizable compound 6
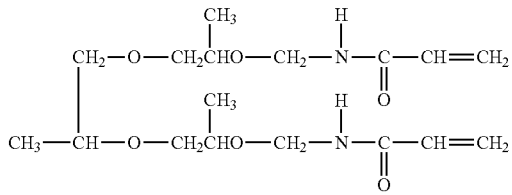
Polymerizable compound 7
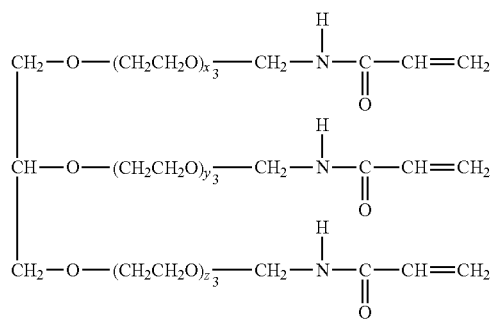
$x_3 + y_3 + z_3 = 6$
Polymerizable compound 8
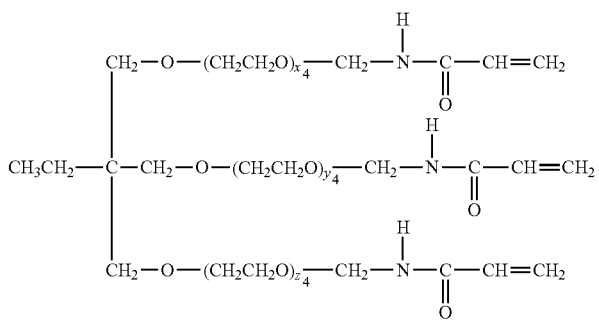
$x_4 + y_4 + z_4 = 9$
Polymerizable compound 9
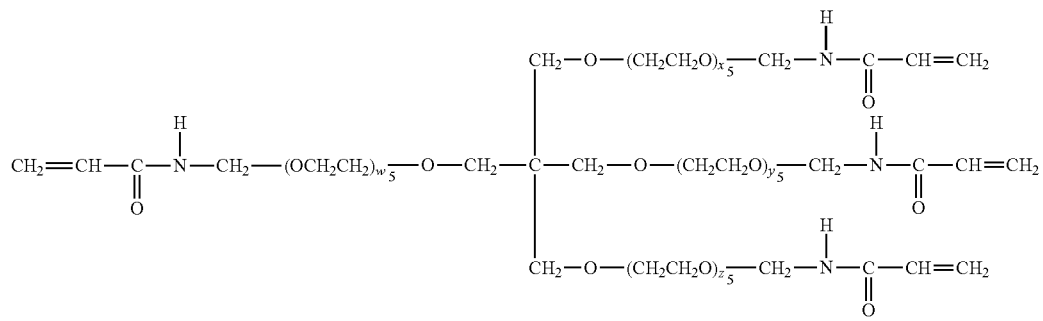
$w_5 + x_5 + y_5 + z_5 = 6$
Polymerizable compound 10
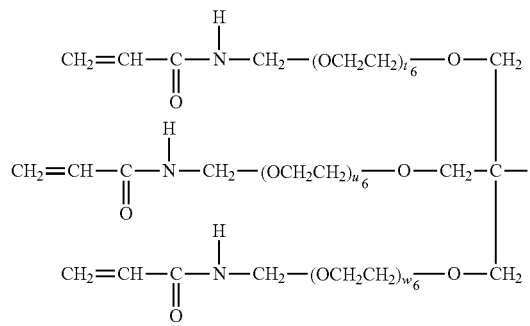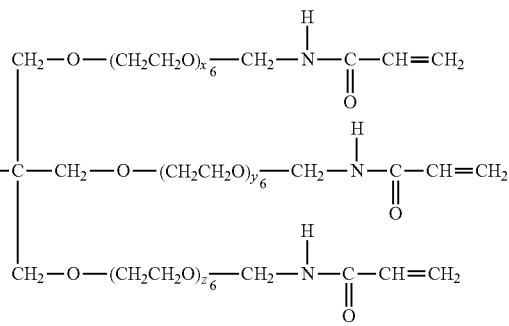
$t_6 + u_6 + w_6 + x_6 + y_6 + z_6 = 12$ Polymerizable compound 11

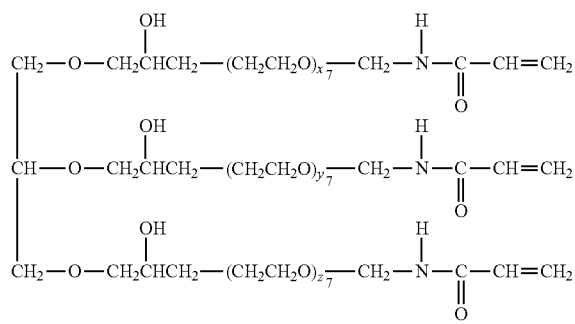

$x_7 + y_7 + z_7 = 3$

Polymerizable compound 12

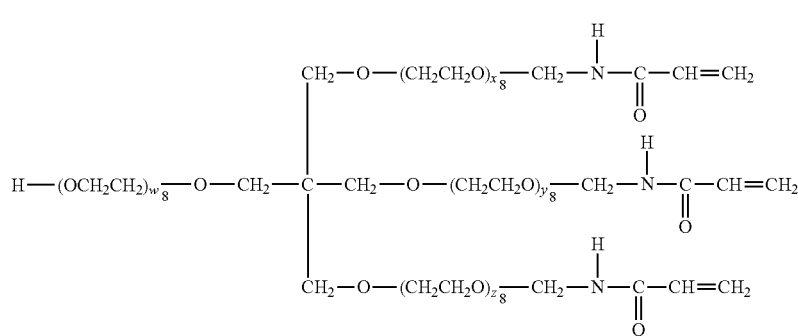

$w_8 + x_8 + y_8 + z_8 = 6$

Polymerizable compound 13

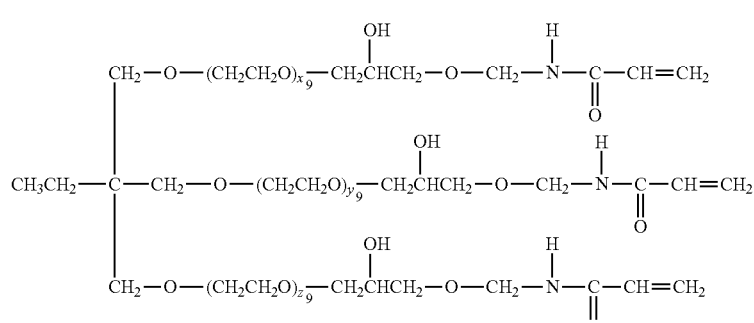

$x_9 + y_9 + z_9 = 3$

The polyvalent (meth)acrylamide compound is preferably a compound represented by the following Formula (2) in terms of its high polymerizability and curability. The compound has four acrylamide or methacrylamide groups in the molecule as polymerizable groups. Furthermore, the compound exhibits curability based on the polymerization reaction by imparting energy such as active energy rays or heat, for example, α-rays, γ-rays, X-rays, ultraviolet rays, visible rays, infrared rays, or electron beams. The compound represented by Formula (2) has solubility in water and is sufficiently dissolved in water or a water-soluble organic solvent such as alcohol.

Formula (2)

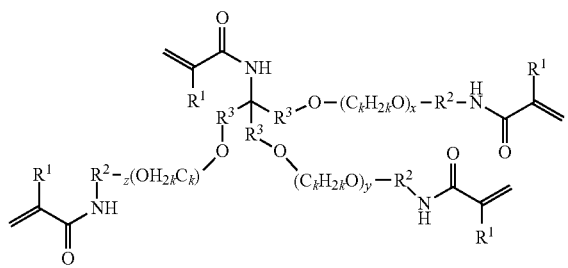

In Formula (2), each of $R^1$'s represents a hydrogen atom or a methyl group, preferably a hydrogen atom. The plural $R^1$'s in Formula (2) may be the same as or different from each other.

Each of $R^2$'s represents a linear or branched alkylene group having from 2 to 4 carbon atoms. The plural $R^2$'s may be the same as or different from each other. $R^2$ is preferably an alkylene group having from 3 to 4 carbon atoms, more preferably an alkylene group having 3 carbon atoms, and still more preferably a linear alkylene group having 3 carbon atoms. The alkylene group represented by $R^2$ may further have a substituent group. Examples of the substituent group include an aryl group and an alkoxy group.

It should be noted that $R^2$ does not have a structure in which the oxygen atom and the nitrogen atom bonded to both ends of the $R^2$ are bonded to the same carbon atom in $R^2$. $R^2$ represents a linear or branched alkylene group that links the oxygen atom and the nitrogen atom of a (meth)acrylamide group. In a case in which the alkylene group has a branched structure, a —O—C—N— structure (a hemiaminal structure) is considered in which the oxygen atom and the nitrogen atom of a (meth)acrylamide group bonded to both ends thereof are bonded to the same carbon atom in the alkylene group. However, the compound represented by Formula (2) does not include a compound having such a structure. The compound having a —O—C—N— structure in the molecule is easily decomposed at the position of the carbon atom and therefore easily degraded during storage. Therefore, such a compound is unfavorable since it causes a decrease in storage stability when included in the ink composition.

Each of $R^3$'s represents a divalent linking group. The plural $R^3$'s may be the same as or different from each other. Examples of the divalent linking group represented by $R^3$ include an alkylene group, an arylene group, and a heterocyclic group, and a group including a combination of these groups. The divalent linking group is preferably an alkylene group. In a case in which the divalent linking group includes an alkylene group, the alkylene group may further include at least one group selected from —O—, —S—, or —$NR^a$—. Here, $R^a$ represents a hydrogen atom or an alkyl group having from 1 to 4 carbon atoms.

In a case in which $R^3$ includes an alkylene group, examples of the alkylene group include a methylene group, an ethylene group, a propylene group, a butylene group, a pentylene group, a hexylene group, a heptylene group, an octylene group, and a nonylene group. The alkylene group represented by $R^3$ has preferably from 1 to 6 carbon atoms, more preferably from 1 to 3 carbon atoms, and still more preferably 1 carbon atom. The alkylene group represented by $R^3$ may further include at least one selected from —O—, —S—, or —$NR^a$—. Examples of the alkylene group including —O— include —$C_2H_4$—O—$C_2H_4$— and —$C_3H_6$—O—$C_3H_6$—. The alkylene group represented by $R^3$ may further have a substituent group, and examples of the substituent group include an aryl group and an alkoxy group.

In a case in which $R^3$ includes an arylene group, examples of the arylene group include a phenylene group and naphthylene group. The arylene group represented by $R^3$ has preferably from 6 to 14 carbon atoms, more preferably from 6 to 10 carbon atoms, and still more preferably 6 carbon atoms. The arylene group represented by $R^3$ may further have a substituent group, and examples of the substituent group include an alkyl group and an alkoxy group.

In a case in which $R^3$ includes a heterocyclic group, the heterocyclic group is preferably a five or six-membered heterocyclic group, which may be a condensed ring. The heterocyclic ring may be an aromatic heterocyclic ring or a non-aromatic heterocyclic ring. Examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzoimidazole, triazole, oxazole, benzoxazole, thiazole, banzothiazole, isothiazole, benzisothiazole, thiadiazole, isoxazole, benzisoxazole, pyrrolidine, piperidine, piperazine, imidazolidine, and thiazoline. In particular, an aromatic heterocyclic group is preferable, and pyridine, pyrazine, pyrimidine, pyridazine, triazine, pyrazole, imidazole, benzoimidazole, triazole, thiazole, banzothiazole, isothiazole, benzisothiazole, and thiadiazole are preferable. While the substitution position of the above-described heterocyclic group is omitted here, the substitution position is not particularly limited. For example, in the case of pyridine, substitution at the 2, 3, or 4-position may be possible, and examples of the heterocyclic group also include these substituted pyridines.

The heterocyclic group may further have a substituent group, and examples of the substituent group include an alkyl group, an aryl group, and an alkoxy group.

In Formula (2), each of k's represents 2 or 3. The plural k's may be the same as or different from each other. The $C_kH_{2k}$ may have a linear structure or a branched structure.

Each of x, y, and z independently represents an integer of 0 to 6, preferably an integer of 0 to 5, and more preferably an integer of 0 to 3. Here, x+y+z satisfies 0 to 18, preferably 0 to 15, and more preferably from 0 to 9.

In particular, it is preferable that $R^1$ represents a hydrogen atom or a methyl group; that $R^2$ represents an alkylene group having from 2 to 4 carbon atoms; that $R^3$ represents an alkylene group having from 1 to 6 (preferably from 1 to 3) carbon atoms; that k represents 2 or 3; that each of x, y, and z independently represents an integer of from 0 to 6; and that x+y+z satisfies 0 to 15.

The specific examples of the compound represented by Formula (2) are shown below. However, the invention is not limited to these examples.

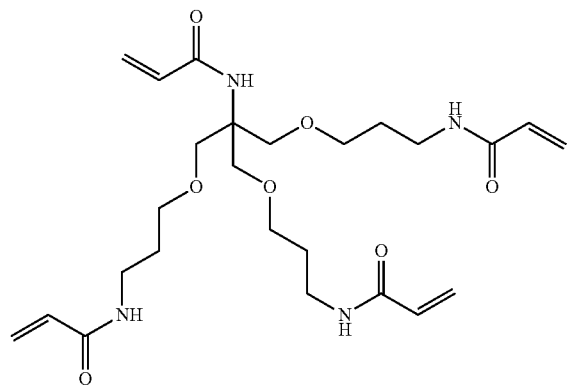

Polymerizable compound a

Polymerizable compound b
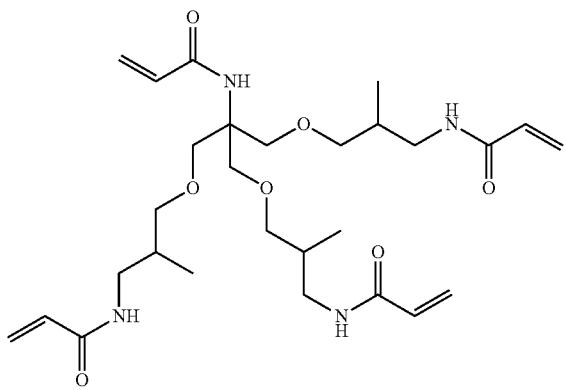
Polymerizable compound c
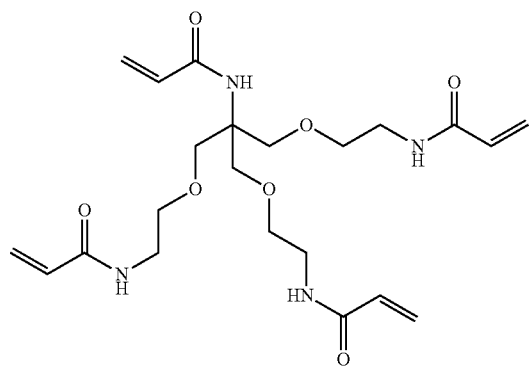
Polymerizable compound d
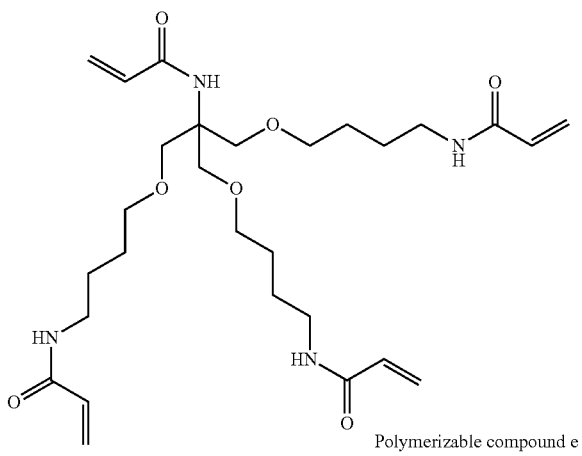
Polymerizable compound e
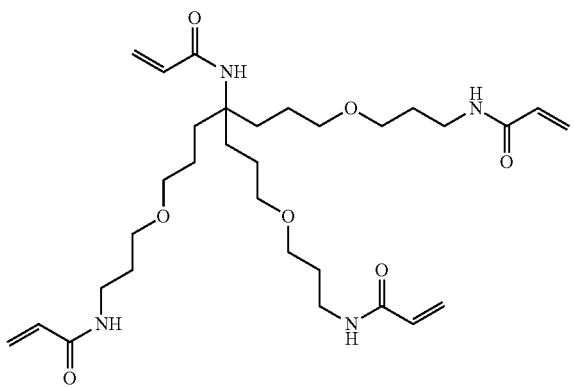
Polymerizable compound f
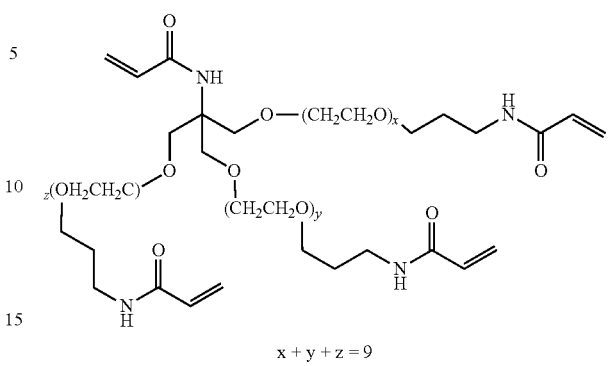
$x + y + z = 9$
The compound represented by Formula (2) can be manufactured, for example, in accordance with the following scheme 1 or 2.
Scheme 1

In scheme 1, the first process is a process of obtaining a polycyano compound by the reaction of acrylonitrile and tris(hydroxymethyl)aminomethane. In this process, the reaction is preferably conducted at 3° C. to 60° C. for 2 hours to 8 hours.

The second process is a process of obtaining a polyamine compound through a reduction reaction by reacting the polycyano compound and hydrogen in the presence of a catalyst. In this process, the reaction is preferably conducted at 20° C. to 60° C. for 5 hours to 16 hours.

The third process is a process of obtaining a polyvalent acrylamide compound by the acylation reaction of the polyamine compound and acryloyl chloride or methacryloyl chloride. In this process, the reaction is preferably conducted at 3° C. to 25° C. for 1 hour to 5 hours. Here, as the acylation agent, a diacrylic anhydride or a dimethacrylic anhydride may be used instead of the acid chloride. In a case in which both acryloyl chloride and methacryloyl chloride are used in the acylation reaction, a compound having an acrylamide group and a methacrylamide group in one molecule can be obtained as the final product.

Scheme 2

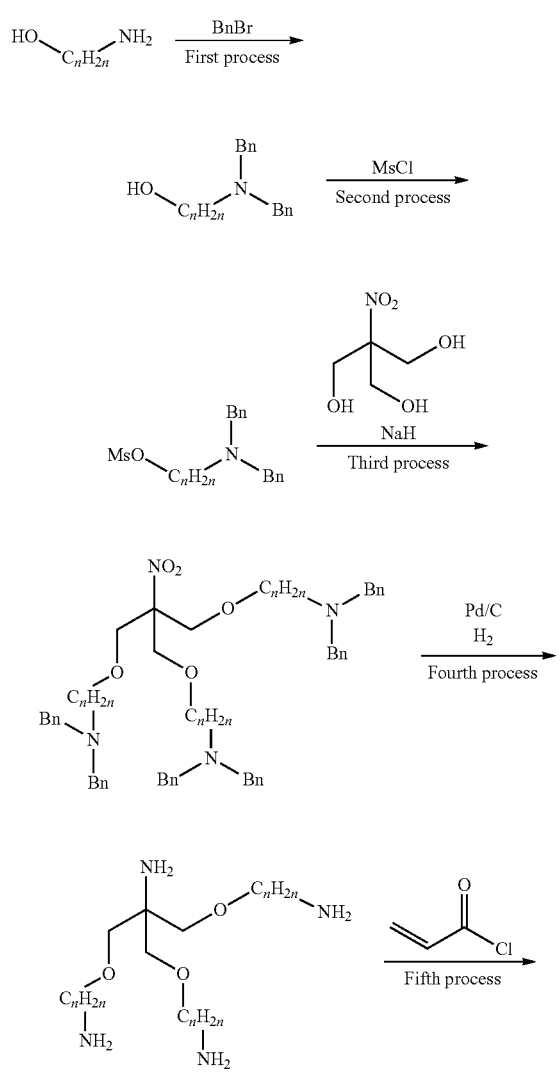

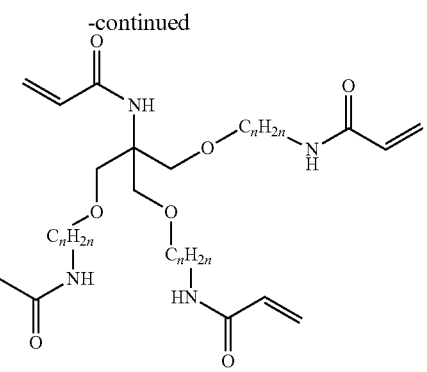

In scheme 2, the first process is a process of obtaining a nitrogen-protected amino alcohol compound by the reaction of introducing a protective group such as a benzyl group or a benzyloxycarbonyl group into the nitrogen atom of amino alcohol. In this process, the reaction is preferably conducted at 3° C. to 25° C. for 3 hours to 5 hours.

The second process is a process of obtaining a sulfonyl compound by introducing a leaving group such as a methanesulfonyl group or a p-toluenesulfonyl group into a OH group of the nitrogen-protected amino alcohol compound. In this process, the reaction is preferably conducted at 3° C. to 25° C. for 2 hours to 5 hours.

The third process is a process of obtaining an amino alcohol-addition compound by the SN2 reaction of the sulfonyl compound and tris(hydroxymethyl)nitromethane. In this process, the reaction is preferably conducted at 3° C. to 70° C. for 5 hours to 10 hours.

The fourth process is a process of obtaining a polyamine compound through the hydrogenation reaction by reacting the amino alcohol-addition compound with hydrogen in the presence of a catalyst. In this process, the reaction is preferably conducted at 20° C. to 60° C. for 5 hours to 16 hours.

The fifth process is a process of obtaining a polyvalent acrylamide compound by the acylation reaction of the polyamine compound and acryloyl chloride or methacryloyl chloride. In this process, the reaction is preferably conducted at 3° C. to 25° C. for 1 hour to 5 hours. Here, as the acylation agent, a diacrylic anhydride or a dimethacrylic anhydride may be used instead of the acid chloride. In a case in which both acryloyl chloride and methacryloyl chloride are used in the acylation reaction, a compound having an acrylamide group and a methacrylamide group in one molecule can be obtained as the final product.

The compound produced through the above processes can be collected by purifying the reaction product liquid with a conventional method. For example, the purification can be carried out with separating extraction using an organic solvent, crystallization using a poor solvent, or column chromatography using a silica gel.

While the above description is given with regard to the case of the polyvalent (meth)acrylamide compound, a monovalent (monofunctional) (meth)acrylamide compound may also be used as the (meth)acrylamide compound.

In a case in which the monovalent (meth)acrylamide compound is used when a coated paper having a pigment layer is used as a recording medium in image formation, excellent permeability to the pigment layer of the ink composition can be obtained. As a result, not only an image but also a pigment layer is cured and therefore an excellent adhesion property of the image to the recording medium can be obtained.

Examples of the monovalent (meth)acrylamide compound include a compound represented by Formula (1) in which n represents 1. In a case in which n represents 1, the group Q may be any monovalent group capable of linking with the (meth)acrylamide structure, and preferably a group having solubility in water. Specific examples thereof include a monovalent residue obtained by removing one or more hydrogen atoms or hydroxy groups from a compound selected from the following compound group X.

Compound group X: ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thioglycol, trimethylolpropane, ditrimethylolpropane, trimethylolethane, ditrimethylolethane, neopentyl glycol, pentaerythritol, and dipentaerythritol; polyol compounds such as condensates of these compounds, low-molecular polyvinyl alcohol, or sugars; and polyamine compounds such as ethylenediamine, diethylenetriamine, triethylenetetramine, polyethyleneimine, or polypropylenediamine.

Examples of the monovalent (meth)acrylamide compound include the following compounds.

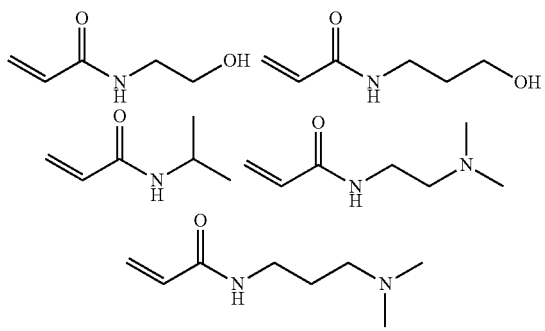

Another polymerizable compound may be used in combination with the (meth)acrylamide compound.

Examples of the polymerizable compound other than the (meth)acrylamide compound include a cationic polymerizable compound. The cationic polymerizable compound is a compound having a cationic group and a polymerizable group such as an unsaturated double bond, and preferable examples thereof that can be used include epoxy monomers and oxetane monomers. In a case in which the cationic polymerizable compound is contained, the ink composition exhibits a strong cationic property due to the inclusion of the cationic group, and therefore color mixing caused when an anionic ink is used can be effectively suppressed.

In the invention, the content of the polymerizable compound in the ink composition with respect to the total mass of the ink composition is preferably from 10% by mass to 50% by mass, and more preferably from 15% by mass to 35% by mass, from the viewpoint of curability of the ink composition.

In the invention, the content of the polyvalent (meth)acrylamide compound in the ink composition with respect to the total mass of the ink composition is preferably from 3% by mass to 15% by mass, more preferably from 5% by mass to 12.5% by mass, and still more preferably from 5% by mass to 10% by mass.

In a case in which the content of the polyvalent (meth)acrylamide compound is 3% by mass or more, curing reactivity is enhanced and homogenous curing is achieved at entire image, and therefore uniform gloss can be easily obtained. Furthermore, in a case in which the content of the polyvalent (meth)acrylamide compound is 15% by mass or less, homogenous curing reactivity is easily achieved over entire image, and therefore uniform gloss can be easily obtained.

Water

The ink composition according to the invention is a water-based ink composition that includes water.

The content of water in the ink composition is not particularly limited. In the invention, the content ratio of water to the total mass of the ink composition can be set to 50% by mass or more. In a case in which the content of water is 50% by mass or more and the ink composition does not include the specific amide compound, the polymerization initiator having a solubility in water of 15 g/L or less tends to easily precipitate in the ink composition. However, due to the inclusion of the specific amide compound in the invention, the precipitation of the polymerization initiator can be suppressed even in a system in which the content ratio of water is 50% by mass or more.

The content of water in the ink composition with respect to the total mass of the ink composition is preferably from 50% by mass to 80% by mass, more preferably from 50% by mass to 75% by mass, and still more preferably from 50% by mass to 70% by mass.

Coloring Agent

The ink composition according to the invention preferably includes at least one coloring agent.

The coloring agent is not particularly limited, and may be a dye or a pigment.

Pigment

The pigment is not particularly limited, and can be appropriately selected depending on the purpose. For example, the pigment may be an organic pigment or an inorganic pigment. The pigment is preferably a pigment that is almost insoluble in water or poorly soluble in water, in terms of ink coloring properties.

Examples of the organic pigment include an azo pigment, a polycyclic pigment, a dye chelate, a nitro pigment, a nitroso pigment, and aniline black. Among these, an azo pigment and a polycyclic pigment are preferable. Examples of the inorganic pigment include titanium oxide, a ferric oxide, calcium carbonate, barium sulfate, aluminum hydroxide, barium yellow, cadmium red, chrome yellow, and carbon black. Among these, carbon black is preferable.

When using the organic pigment, the average particle diameter of the organic pigment is preferably small from the viewpoints of transparency and color reproducibility, while the average particle diameter of the organic pigment is preferably large from the viewpoint of light-fastness. From the viewpoint of taking a balance between them, the average particle diameter is preferably from 10 nm to 200 nm, more preferably from 10 nm to 150 nm, and still more preferably from 10 nm to 120 nm. The particle diameter distribution of the organic pigment is not particularly limited, and may be a broad particle diameter distribution or a monodispersed particle diameter distribution. Further, a mixture of two or more organic pigments having monodispersed particle diameter distributions may be used.

Dispersant

The ink composition according to the invention may include at least one dispersant. The dispersant for the pigment may be a polymer dispersant or a low-molecular surfactant-type dispersant. The polymer dispersant may be a water-soluble dispersant or a water-insoluble dispersant.

The low-molecular surfactant-type dispersant can stably disperse the pigment in an aqueous medium, while maintaining the viscosity of the ink at a low level. The low-molecular surfactant-type dispersant is a low-molecular dispersant having a molecular weight of 2,000 or less. The molecular weight of the low-molecular surfactant-type dispersants is preferably from 100 to 2,000, and more preferably from 200 to 2,000.

The low-molecular surfactant-type dispersant has a structure containing a hydrophilic group and a hydrophobic group. The low-molecular surfactant-type dispersant may include one or more hydrophilic groups and one or more hydrophobic groups independently, or may have plural kinds of the hydrophilic groups and plural kinds of the hydrophobic groups. The low-molecular surfactant-type dispersant may appropriately have a linking group for linking the hydrophilic group and the hydrophobic group.

The hydrophilic group is an anionic group, a cationic group, a nonionic group, or a betaine group that is a combination of these groups. The anionic group may be any group as long as it is negatively-charged, and preferably a phosphate group, a phosphonate group, a phosphinate group, a sulfate group, a sulfonate group, a sulfinate group, or a carboxylate group, more preferably a phosphate group or a carboxylate group, and still more preferably a carboxylate group. The cationic group may be any group as long as it is positively-charged, and preferably an organic cationic substituent group, and more preferably a nitrogen-based cationic group or a phosphorus-based cationic group. The cationic group is still more preferably a pyridinium cationic group or an ammonium cationic group. Examples of the nonionic group include a polyethylene oxide, a polyglycerol, and a part of a sugar unit.

The hydrophilic group is preferably an anionic group. The anionic group is preferably a phosphate group, a phosphonate group, a phosphinate group, a sulfate group, a sulfonate group, a sulfinate group, or a carboxylate group, more preferably a phosphate group or a carboxylate group, and still more preferably a carboxylate group.

In a case in which the low-molecular surfactant-type dispersant has an anionic hydrophilic group, the pKa thereof is preferably 3 or more from the viewpoint of enhancing the aggregation reaction when brought into contact with an acidic treatment liquid. The pKa of the low-molecular surfactant-type dispersant is a value experimentally determined based on the titration curve obtained by titrating a liquid in which 1 mmol/L of the low-molecular surfactant-type dispersant is dissolved in a tetrahydrofuran-water (3:2=V/V) solution with an acid or alkaline aqueous solution. In a case in which the pKa of the low-molecular surfactant-type dispersant is 3 or more, theoretically 50% or more of the anionic groups are undissociated when brought into contacted with a liquid having a pH of about 3. As a result, the solubility in water of the low-molecular surfactant-type dispersant is significantly decreased and the aggregation reaction is caused, and thereby the aggregation reactivity is improved. In view of this, the low-molecular surfactant-type dispersant preferably has a carboxylate group as an anionic group.

The hydrophobic group has a hydrocarbon structure, a fluorocarbon structure, or a silicone structure, and preferably has a hydrocarbon structure. The hydrophobic group may have a linear structure or a branched structure. The hydrophobic group may have a single-stranded structure or a two or more-stranded structure. In a case in which the hydrophobic group has a two or more-stranded structure, the hydrophobic group may have plural types of hydrophobic groups.

The hydrophobic group is preferably a hydrocarbon group having from 2 to 24 carbon atoms, more preferably a hydrocarbon group having from 4 to 24 carbon atoms, and still preferably a hydrocarbon group having from 6 to 20 carbon atoms.

As the polymer dispersant, examples of the water-soluble polymer dispersant include a hydrophilic polymer compound. Examples of natural hydrophilic polymer compounds include plant polymers such as gum arabic, gum tragacanth, guar gum, gum karaya, locust bean gum, arabinogalactan, pectin, or quince seed starch; sea weed-based polymers such as alginic acid, carrageenan, or agar; animal-based polymers such as gelatin, casein, albumin, or collagen; and microbial polymers such as xanthan gum or dextran.

Examples of hydrophilic polymer compounds obtained by chemically modifying natural raw materials include cellulose-based polymers such as methyl cellulose, ethyl cellulose, hydroxyethyl cellulose, hydroxypropyl cellulose, or carboxymethyl cellulose; starch-based polymers such as sodium starch glycolate or sodium starch phosphate ester; and sea weed-based polymers such as sodium alginate or propylene glycol alginate.

Examples of synthetic hydrophilic polymer compounds include vinyl-based polymers such as polyvinyl alcohol, polyvinyl pyrrolidone, or polyvinyl methyl ether; acrylic resins such as non-cross-linked polyacrylamide, polyacrylic acid or an alkali metal salt thereof, or a water-soluble styrene acrylic resin; water-soluble styrene maleic acid resins, water-soluble vinylnaphthalene acrylic resins, water-soluble vinylnaphthalene maleic acid resins, polyvinyl pyrrolidone, polyvinyl alcohol, alkali metal salts of formalin condensates of β-naphthalene sulfonic acid, polymer compounds having, at a side chain, a salt of a cationic functional group such as a quaternary ammonium group or an amino group; and natural polymer compounds such as shellac.

Among these, preferable examples of the hydrophilic polymer compound include water-soluble dispersant into which a carboxyl group is introduced, such as homopolymers of acrylic acid, methacrylic acid, or styrene acrylic acid, or copolymers with another monomer having a hydrophilic group.

Among the polymer dispersant, as the water-insoluble dispersant, a polymer having both hydrophilic and hydrophobic moieties can be used. Examples thereof include styrene-(meth)acrylic acid copolymers, styrene-(meth)acrylic acid-(meth)acrylic ester copolymers, (meth)acrylic ester-(meth)acrylic acid copolymers, polyethylene glycol(meth)acrylate-(meth)acrylic acid copolymers, vinyl acetate-maleic acid copolymers, and styrene-maleic acid copolymers.

The weight average molecular weight of the polymer dispersant is preferably from 3,000 to 100,000, more preferably from 5,000 to 50,000, still more preferably from 5,000 to 40,000, and even more preferably from 10,000 to 40,000.

From the viewpoint of self dispersibility and the aggregation speed when brought into contact with a treatment liquid, the polymer dispersant includes preferably a polymer having a carboxyl group, more preferably a polymer having a carboxyl group and an acid value of 100 mg KOH/g or less, and still more preferably a polymer having a carboxyl group and an acid value of from 25 mg KOH/g to 100 mg KOH/g. In particular, the polymer dispersant having a carboxyl group and an acid value of from 25 mg KOH/g to 100 mg KOH/g is preferable, in a case in which a treatment liquid to aggregate a component in the ink composition is used in combination with the ink composition according to the invention. The treatment liquid is described below.

The mixing mass ratio (p:s) of the pigment (p) to the dispersant (s) is preferably in a range of from 1:0.06 to 1:3, more preferably in a range of from 1:0.125 to 1:2, and still more preferably in a range of from 1:0.125 to 1:1.5.

A dye may be used instead of the pigment. In a case in which the dye is used, a dye retained on a water-insoluble carrier may be used. The carrier retaining the dye (water-insoluble coloring particles) can be used in the form of an aqueous dispersion formed by using a dispersant. As the dispersant, the above-mentioned dispersants can be suitably used.

The ink composition in the invention preferably includes the pigment and the dispersant, and more preferably includes the organic pigment and the polymer dispersant as a water-dispersible pigment in which at least a part of the pigment surface is covered with a polymer dispersant, from the viewpoint of light-fastness and quality of the image. In particular, the ink composition preferably includes the organic pigment and the polymer dispersant having a carboxyl group, and includes a water-dispersible pigment in which at least a part of the pigment surface is covered with a polymer dispersant having a carboxyl group. Furthermore, the pigment is preferably covered with a polymer dispersant containing a carboxyl group, and is water-insoluble, from the viewpoint of aggregation properties.

The average particle diameter of the pigment in dispersed state is preferably from 10 nm to 200 nm, more preferably from 10 nm to 150 nm, and still more preferably from 10 nm to 100 nm. In a case in which the average particle diameter is 200 nm or less, the color reproducibility is excellent and ejection characteristics are excellent in a case in which droplets are ejected by an ink jet method. In a case in which the average particle diameter is 10 nm or more, light-fastness is excellent. The particle diameter distribution of the coloring material is not particularly limited, and may be either a broad particle diameter distribution or a monodispersed particle diameter distribution. Further, a mixture of two or more coloring materials having monodispersed particle diameter distributions may be used. Here, the average particle diameter of the pigment in dispersed state indicates the average particle diameter when prepared as an ink, and the same applies to a so-called concentrated ink dispersion before prepared as an ink.

The average particle diameter of the pigment in dispersed state and the average particle diameter and the particle diameter distribution of the polymer particles are determined by measuring the volume average particle diameters with a dynamic light scattering method, using a NANOTRAC particle size distribution measuring instrument UPA-EX150 (trade name, manufactured by NIKKISO Co., Ltd.).

The pigment may be used singly, or in combination of two or more kinds thereof.

From the viewpoint of the image density, the content of the pigment in the ink composition is preferably from 1% by mass to 20 by mass, and more preferably from 2% by mass to 10% by mass, based on the ink composition.

Dye

As the dye, a known dye can be used without particular limitation, and the dyes described in, for example, JP-A Nos. 2001-115066, 2001-335714, 2002-249677, and the like can also be used preferably in the invention.

In a case in which the dye is used, a dye retained on a water-insoluble carrier may be used. As the carrier, an inorganic material, an organic material, or a composite material thereof, which is insoluble in water or poorly soluble in water, can be used without particular limitation. Specifically, the carriers described in, for example, JP-A Nos. 2001-181549, 2007-169418, and the like can also be used preferably in the invention.

Polymer Particles

The ink composition according to the invention may include at least one kind of polymer particles.

When the ink composition is brought into contact with a treatment liquid to be described below or a region in which the treatment liquid has been dried, the dispersion is destabilized and a pigment and the like aggregate. The polymer particles have a function of fixing the ink composition to the recording medium by increasing the viscosity of the ink composition when the dispersion is destabilized and a pigment and the like aggregate. That is, when the ink composition includes the polymer particles, the adhesion property of the ink composition to the recording medium and the abrasion resistance of the image can be improved.

The polymer particles may be used, for example, in the form of latex in which particle polymers are dispersed in an aqueous medium. Examples of the polymer include an acrylic resin, a vinyl acetate resin, a styrene-butadiene resin, a vinyl chloride resin, an acryl-styrene resin, a butadiene resin, a styrene resin, a cross-linked acrylic resin, a cross-linked styrene resin, a benzoguanamine resin, a phenolic resin, a silicone resin, an epoxy resin, an urethane resin, a paraffinic resin, and a fluororesin. Preferable examples thereof include an acrylic resin, an acryl-styrene resin, a styrene resin, a cross-linked acrylic resin, and a cross-linked styrene resin The polymer particles are preferably self-dispersing polymer particles.

Hereinbelow, as an example, the self-dispersing polymer particles are described in detail.

The self-dispersing polymer particles mean particles of a water-insoluble polymer that can form a dispersed state (particularly, a dispersed state obtained by phase inversion emulsification) in an aqueous medium by means of a functional group (particularly, an acidic group or a salt thereof) included in the polymer per se in the absence of an additional surfactant, in which the water-insoluble polymer particles contain no free emulsifier.

The self-dispersing polymer particles are preferable from the viewpoints of ejection stability and liquid stability (particularly, dispersion stability) of a system containing a pigment.

The term "dispersed state" as used herein includes an emulsified state in which a water-insoluble polymer is dispersed in a liquid state in an aqueous medium (emulsion) and a dispersed state in which a water-insoluble polymer is dispersed in a solid state in an aqueous medium (suspension).

The water-insoluble polymer in the invention is preferably a water-insoluble polymer that can form a dispersed state in which a water-insoluble polymer is dispersed in a solid state, from the viewpoints of an aggregation speed and a fixing property in a case in which it is used in a liquid composition.

Examples of the method of preparing the emulsion state or dispersion state of the self-dispersing polymer (that is, an aqueous dispersion of the self-dispersing polymer) include phase inversion emulsification. Examples of the phase inversion emulsification include a method in which the self-dispersing polymer is dissolved or dispersed in a solvent (for example, a hydrophilic organic solvent) and then put into water directly without addition of a surfactant, stirring and mixing is performed on the resultant in a state in which a salt-forming group (for example, an acidic group) of the self-dispersing polymer has been neutralized, the solvent is removed, and then an aqueous dispersion in an emulsion state or a dispersion state is obtained.

The dispersion state of the self-dispersing polymer refers to the state in which the stable dispersion state can be visually observed for at least one week at 25° C. with regard to a liquid, which is obtained by mixing and stirring (device: a stirring device provided with a stirring blade, rotation frequency 200 rpm, 30 minutes, 25° C.) a solution in which 30 g of a water-insoluble polymer is dissolved in 70 g of an organic solvent (for example, methyl ethyl ketone), a neutralizing agent that can neutralize 100% of salt-forming groups of the water-insoluble polymer (sodium hydroxide if the salt-forming group is anionic, and acetic acid if it is cationic), and 200 g of water, and then removing the organic solvent therefrom.

The water-insoluble polymer means a polymer which is dissolved in a dissolution amount of 10 g or less in a case in which the polymer is dried at 105° C. for 2 hours and then dissolved in 100 g of water at 25° C. The dissolution amount is preferably 5 g or less, and more preferably 1 g or less. The dissolution amount is a dissolution amount of the polymer neutralized to 100% with sodium hydroxide or acetic acid in accordance with the kind of the salt-forming group of the water-insoluble polymer.

The aqueous medium contains water and may optionally contain a hydrophilic organic solvent. In the invention, the aqueous medium preferably consists of water, and the hydrophilic organic solvent in an amount of 0.2% by mass or less with respect to water, and more preferably consists of water.

The main chain skeleton of the water-insoluble polymer is not particularly limited, and for example, a vinyl polymer or a condensed polymer (such as an epoxy resin, a polyester, a polyurethane, a polyamide, a cellulose, a polyether, a polyurea, a polyimide, or a polycarbonate) may be used. Among these, a vinyl polymer is preferable.

Preferable examples of the vinyl polymer and a monomer constituting the vinyl polymer include those described in JP-A Nos. 2001-181549 and 2002-88294. Further, a vinyl polymer having a dissociative group introduced to a terminal end of a polymer chain by radical polymerization of a vinyl monomer using a chain transfer agent, a polymerization initiator, or an iniferter having a dissociative group (or a substituent that can be induced to the dissociative group), or by ionic polymerization using a compound having a dissociative group (or substituent that can be induced to the dissociative group) as either an initiator or a terminator can also be used.

Preferable examples of a condensed polymer and a monomer constituting the condensed polymer include those described in JP-A No. 2001-247787.

The self-dispersing polymer particles preferably contain a water-insoluble polymer containing a hydrophilic constituent unit and a constituent unit derived from an aromatic group-containing monomer, from the viewpoint of self-dispersibility.

The hydrophilic constituent unit is not particularly limited as long as it is derived from a hydrophilic group-containing monomer, and it may be either a unit derived from one kind of hydrophilic group-containing monomer or a unit derived from two or more kinds of hydrophilic group-containing monomers. The hydrophilic group is not particularly limited and it may be either a dissociative group or a nonionic hydrophilic group.

The hydrophilic group is preferably a dissociative group from the viewpoints of promoting the self-dispersibility and stability of the formed emulsified or dispersed state, and more preferably an anionic dissociative group. Examples of the dissociative group include a carboxyl group, a phosphoric acid group, and a sulfonic acid group. Among these, the carboxyl group is preferable from the viewpoints of the fixing property of the prepared ink composition.

The hydrophilic group-containing monomer is preferably a dissociative group-containing monomer, and preferably a dissociative group-containing monomer having a dissociative group and an ethylenically unsaturated bond, from the viewpoints of self-dispersibility and aggregation properties. Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methyl succinic acid.

Specific examples of the unsaturated sulfonic acid monomer include styrene sulfonic acid, 2-acrylamide-2-methylpropane sulfonic acid, 3-sulfopropyl(meth)acrylate, and bis-(3-sulfopropyl)-itaconic acid ester.

Specific examples of the unsaturated phosphoric acid monomer include vinylphosphonic acid, vinyl phosphate, bis (methacryloyloxyethyl)phosphate, diphenyl-2-acryloyloxyethyl phosphate, diphenyl-2-methacryloyloxyethyl phosphate, and dibutyl-2-acryloyloxyethyl phosphate.

The dissociative group-containing monomer is preferably an unsaturated carboxylic acid monomer, more preferably an acrylic monomer, and still more preferably acrylic acid and methacrylic acid, from the viewpoints of dispersion stability and ejection stability.

The acid value of the self-dispersing polymer in the invention is preferably 150 mg KOH/g or less, from the viewpoint of an excellent aggregation property when brought into contact with a treatment liquid. The acid value is more preferably from 25 mg KOH/g to 100 mg KOH/g, still more preferably from 30 mg KOH/g to 70 mg KOH/g. In a case in which the acid value of the self-dispersing polymer is 25 mg KOH/g or more, stability of self-dispersibility is excellent.

The self-dispersing polymer particles preferably contain a polymer containing a carboxyl group, more preferably contains a polymer containing a carboxyl group and having an acid value of from 25 mg KOH/g to 150 mg KOH/g, and still more preferably contains a polymer containing a carboxyl group and having an acid value of from 30 mg KOH/g to 100 mg KOH/g, from the viewpoints of self-dispersibility and the aggregation speed when brought into contact with the treatment liquid.

The aromatic group-containing monomer is not particularly limited as long as it is a compound containing an aromatic group and a polymerizable group. The aromatic group may be either a group derived from an aromatic hydrocarbon or a group derived from an aromatic heterocyclic ring. In the invention, the aromatic group is preferably an aromatic group derived from the aromatic hydrocarbon, from the viewpoint of stability of the particle shape in the aqueous medium.

The polymerizable group may be either a polycondensing polymerizable group or an addition polymerizing polymerizable group. The polymerizable group is preferably an addition polymerizing polymerizable group, and more preferably a group containing an ethylenically unsaturated bond, from the viewpoint of stability of the particle shape in the aqueous medium.

The aromatic group-containing monomer is preferably a monomer containing an aromatic group derived from an aromatic hydrocarbon and an ethylenically unsaturated bond. The aromatic group-containing monomer may be used singly, or in combination of two or more kinds thereof.

Examples of the aromatic group-containing monomer include phenoxyethyl(meth)acrylate, benzyl(meth)acrylate, phenyl(meth)acrylate, and a styrene monomer. Among these, from the viewpoints of the balance between the hydrophilicity and the hydrophobicity of the polymer chain and the ink fixing property, the aromatic group-containing monomer is preferably an aromatic group-containing (meth)acrylate monomer, more preferably at least one selected from the group consisting of phenoxyethyl(meth)acrylate, benzyl (meth)acrylate, and phenyl(meth)acrylate, and still more preferably phenoxyethyl(meth)acrylate and/or benzyl(meth) acrylate.

Here, the term "(meth)acrylate" means acrylate or methacrylate.

The self-dispersing polymer is preferably an acrylic resin containing a structural unit derived from a (meth)acrylate monomer, and more preferably an acrylic resin containing a structural unit derived from an aromatic group-containing (meth)acrylate monomer. It is more preferable that the self-dispersing polymer contains a structural unit derived from an aromatic group-containing (meth)acrylate monomer at a content of from 10% by mass to 95% by mass. In a case in which the content of the aromatic group-containing (meth)acrylate monomer is from 10% by mass to 95% by mass, the stability of the self-emulsified or dispersed state can be further improved, and the increase in the viscosity of ink can be inhibited. The content of the aromatic group-containing (meth)acrylate monomer is preferably from 15% by mass to 90% by mass, more preferably from 15% by mass to 80% by mass, and still more preferably from 25% by mass to 70% by mass, from the viewpoints of the stability of the self-dispersed state, stabilizing the shape of the particles in the aqueous medium due to the hydrophobic interaction between the aromatic rings, and decreasing the amount of the water soluble component by moderately hydrophobizing the particles.

The self-dispersing polymer may include, for example, a structural unit derived from an aromatic group-containing monomer and a structural unit derived from a dissociative group-containing monomer. In addition, the self-dispersing polymer may further contain another structural unit, if necessary.

The monomer for constituting another structural unit is not particularly limited as long as it is a monomer copolymerizable with the aromatic group-containing monomer and the dissociative group-containing monomer. In particular, from the viewpoints of the flexibility of the polymer skeleton and the ease of controlling the glass transition temperature (Tg), the monomer is preferably an alkyl group-containing monomer.

Example of the alkyl group-containing monomer include alkyl esters of (meth)acrylic acid (preferably, a C1-C4 alkyl (meth)acrylate) such as alkyl(meth)acrylates (e.g., methyl (meth)acrylate, ethyl(meth)acrylate, isopropyl(meth)acrylate, n-propyl(meth)acrylate, n-butyl(meth)acrylate, isobutyl (meth)acrylate, t-butyl(meth)acrylate, hexyl(meth)acrylate, and ethylhexyl(meth)acrylate), ethylenically unsaturated monomers having a hydroxy group (e.g., hydroxymethyl (meth)acrylate, 2-hydroxyethyl(meth)acrylate, 2-hydroxypropyl(meth)acrylate, 4-hydroxybutyl(meth)acrylate, hydroxypentyl(meth)acrylate, and hydroxyhexyl(meth)acrylate), and dialkylamino alkyl(meth)acrylates (e.g., dimethylaminoethyl(meth)acrylate); and (meth)acrylamide monomers including(meth)acrylamides such as N-hydroxyalkyl (meth)acrylamide (e.g., N-hydroxymethyl(meth)acrylamide, N-hydroxyethyl(meth)acrylamide, and N-hydroxybutyl (meth)acrylamide), and N-alkoxyalkyl(meth)acrylamides (e.g., N-methoxymethyl(meth)acrylamide, N-ethoxymethyl (meth)acrylamide, N-(n-,iso)butoxymethyl(meth)acrylamide, N-methoxyethyl(meth)acrylamide, N-ethoxyethyl (meth)acrylamide, and N-(n-,iso)butoxyethyl(meth) acrylamide).

The molecular weight of the water-insoluble polymer that constitutes the self-dispersing polymer particles is preferably from 3,000 to 200,000, more preferably from 5,000 to 150,000, and still more preferably from 10,000 to 100,000 in terms of a weight average molecular weight. In a case in which the weight average molecular weight is set to 3,000 or more, the amount of the water-soluble component can be suppressed effectively. In a case in which the weight average molecular weight is set to 200,000 or less, the self-dispersion stability can be increased.

The weight average molecular weight is measured by gel permeation chromatography (GPC). In GPC, HLC-8220GPC (manufactured by Tosoh Corporation), three columns of TSKgel Super HZM-H, TSK gel Super HZ4000, and TSK gel Super HZ2000 (manufactured by Tosoh Corporation, 4.6 mm ID×15 cm), and THF (tetrahydrofuran) as an eluent are used. The measurement conditions are as follows: sample concentration of 0.35% by mass, a flow rate of 0.35 mL/min, an amount of the sample injected of 10 μL, and a measurement temperature of 40° C. An RI detector is used for the measurement. The standard curve is obtained from eight samples: "standard sample TSK standard, polystyrene" of "F-40", "F-20", "F-4", "F-1", "A-5000", "A-2500", and "A-1000", and "n-propylbenzene" (manufactured by Tosoh Corporation).

From the viewpoint of regulating hydrophilicity and hydrophobicity of the polymer, the water-insoluble polymer that constitutes the self-dispersing polymer particles preferably contains a structural unit derived from an aromatic group-containing (meth)acrylate monomer (preferably contains a structural unit derived from phenoxyethyl(meth)acrylate and/or a structural unit derived from benzyl(meth)acrylate) in an amount of from 15% by mass to 80% by mass in terms of a copolymerization ratio with respect to the total mass of the self-dispersing polymer particles.

From the viewpoint of regulating hydrophilicity and hydrophobicity of the polymer, it is more preferable that the water-insoluble polymer contains a structural unit derived from an aromatic group-containing (meth)acrylate monomer in an amount of from 15% by mass to 80% by mass in terms of a copolymerization ratio, a structural unit derived from a carboxyl group-containing monomer, and a structural unit derived from an alkyl group-containing monomer (preferably a structural unit derived from an alkyl ester of (meth)acrylic acid). It is still more preferable that the water-insoluble polymer contains a structural unit derived from phenoxyethyl (meth)acrylate and/or a structural unit derived from benzyl (meth)acrylate in an amount of from 15% by mass to 80% by mass in terms of a copolymerization ratio, a structural unit derived from a carboxyl group-containing monomer, and a structural unit derived from an alkyl group-containing monomer (preferably a structural unit derived from a C1-C4 alkyl ester of (meth)acrylic acid). Furthermore, it is preferable that the water-insoluble polymer has an acid value of from 25 mg KOH/g to 100 mg KOH/g, and a weight average molecular weight of from 3000 to 200,000, and it is more preferable that the water-insoluble polymer has an acid value of from 25 mg KOH/g to 95 mg KOH/g, and a weight average molecular weight of from 5000 to 150,000.

Hereinbelow, specific examples of the water-insoluble polymer (exemplified compounds B-01 to B-19) that constitutes the self-dispersing polymer particles are described.

However, the invention is not limited to these examples. In the parenthesis, a mass ratio between copolymerization components is described.

B-01: Phenoxyethyl acrylate/methyl methacrylate/acrylic acid copolymer (50/45/5)

B-02: Phenoxyethyl acrylate/benzyl methacrylate/isobutyl methacrylate/methacrylic acid copolymer (30/35/29/6)

B-03: Phenoxyethyl methacrylate/isobutyl methacrylate/methacrylic acid copolymer (50/44/6)

B-04: Phenoxyethyl acrylate/methyl methacrylate/ethyl acrylate/acrylic acid copolymer (30/55/10/5)

B-05: Benzyl methacrylate/isobutyl methacrylate/methacrylic acid copolymer (35/59/6)

B-06: Styrene/phenoxyethyl acrylate/methyl methacrylate/acrylic acid copolymer (10/50/35/5)

B-07: Benzyl acrylate/methyl methacrylate/acrylic acid copolymer (55/40/5)

B-08: Phenoxyethyl methacrylate/benzyl acrylate/methacrylic acid copolymer (45/47/8)

B-09: Styrene/phenoxyethyl acrylate/butyl methacrylate/acrylic acid copolymer (5/48/40/7)

B-10: Benzyl methacrylate/isobutyl methacrylate/cyclohexyl methacrylate/methacrylic acid copolymer (35/30/30/5)

B-11: Phenoxyethyl acrylate/methyl methacrylate/butyl acrylate/methacrylic acid copolymer (12/50/30/8)

B-12: Benzyl acrylate/isobutyl methacrylate/acrylic acid copolymer (93/2/5)

B-13: Styrene/phenoxyethyl methacrylate/butyl acrylate/acrylic acid copolymer (50/5/20/25)

B-14: Styrene/butyl acrylate/acrylic acid copolymer (62/35/3)

B-15: Methyl methacrylate/Phenoxyethyl acrylate/acrylic acid copolymer (45/51/4)

B-16: Methyl methacrylate/Phenoxyethyl acrylate/acrylic acid copolymer (45/49/6)

B-17: Methyl methacrylate/Phenoxyethyl acrylate/acrylic acid copolymer (45/48/7)

B-18: Methyl methacrylate/Phenoxyethyl acrylate/acrylic acid copolymer (45/47/8)

B-19: Methyl methacrylate/Phenoxyethyl acrylate/acrylic acid copolymer (45/45/10)

The method of producing the water-insoluble polymer that constitutes the self-dispersing polymer particles is not particularly limited. Examples thereof include a method in which emulsion polymerization is carried out in the presence of a polymerizable surfactant thereby covalently-bonding the surfactant and the water-insoluble polymer, and a method in which a monomer mixture containing a hydrophilic group-containing monomer and an aromatic group-containing monomer is copolymerized by a known polymerization method such as a solution polymerization method or a bulk polymerization method. Among these polymerization methods, the solution polymerization method is preferable, and a solution polymerization method in which an organic solvent is used is more preferable, from the viewpoints of the aggregation speed and the droplet ejection stability of the ink composition.

From the viewpoints of the aggregation speed, it is preferable that the self-dispersing polymer particles include a polymer synthesized in an organic solvent, and the polymer has a carboxyl group (preferably having an acid value of from 25 mg KOH/g to 50 mg KOH/g), in which the carboxyl groups of the polymer are partially or entirely neutralized, and the polymer is prepared as a polymer dispersion in a continuous phase of water. That is, the preparation of the self-dispersing polymer particles in the invention is preferably carried out by a method including a process of synthesizing a polymer in an organic solvent and a dispersion process of forming an aqueous dispersion in which at least a portion of the carboxyl groups of the polymer is neutralized.

The dispersion process preferably includes the following process (1) and process (2).

Process (1): a process of stirring a mixture containing a polymer (water-insoluble polymer), an organic solvent, a neutralizing agent, and an aqueous medium.

Process (2): a process of removing the organic solvent from the mixture.

The process (1) is preferably a process of first dissolving the polymer (water-insoluble polymer) in the organic solvent and then gradually adding the neutralizing agent and the aqueous medium, and mixing and stirring the mixture to obtain a dispersion. By adding the neutralizing agent and the aqueous medium to the solution of the water-insoluble polymer dissolved in the organic solvent, self-dispersing polymer particles having a particle diameter with higher storage stability can be obtained without requiring a strong shearing force. The method for stirring the mixture is not particularly limited, and a generally-used mixing and stirring apparatus, and optionally, a disperser such as an ultrasonic disperser or a high pressure homogenizer can be used.

Preferable examples of the organic solvent include an alcohol-based solvent, a ketone-based solvent, and an ether-based solvent. The details of these organic solvents are described in paragraph [0109] of JP-A No. 2011-42150. In particular, a ketone solvent such as methyl ethyl ketone and an alcohol solvent such as isopropyl alcohol are preferable. Moreover, from the viewpoint of a mild polarity change caused when phase inversion from an oil phase to an aqueous phase occurs, it is preferable to use isopropyl alcohol together with methyl ethyl ketone. In a case in which these solvents are used in combination, self-dispersing polymer particles with a small particle size having a high degree of dispersion stability without causing aggregation and precipitation or fusing between particles can be obtained.

The neutralizing agent is used to partially or entirely neutralize the dissociative groups so that the self-dispersing polymer can form a stable emulsified or dispersed state in water. In a case in which the self-dispersing polymer has an anionic dissociative group (for example, a carboxyl group) as the dissociative group, examples of the neutralizing agent to be used include a basic compound such as an organic amine compound, ammonia, and an alkali metal hydroxide. The details of these neutralizing agents are described in paragraph [0110] of JP-A No. 2011-42150. In particular, a sodium hydroxide, potassium hydroxide, triethylamine, and triethanolamine are preferable from the viewpoint of dispersion stabilization of the self-dispersing polymer particles in water.

The basic compound is used preferably in an amount of from 5% by mol to 120% by mol with respect to 100% by mol of the dissociative groups. The details of the ratio are described in paragraph [0111] of JP-A No. 2011-42150.

In the process (2), an aqueous dispersion of the self-dispersing polymer particles can be obtained by phase inversion to the aqueous system by distilling off the organic solvent from the dispersion obtained in the process (1) by an ordinary method such as distillation under a reduced pressure. In the obtained aqueous dispersion, the organic solvent is substantially removed and the amount of the organic solvent is preferably from 0.2% by mass or less, and more preferably 0.1% by mass or less.

The average particle diameter of the polymer particles is, in terms of a volume average particle diameter, preferably in a range of from 1 nm to 70 nm, more preferably in a range of from 2 nm to 60 nm, and still more preferably in a range of from 2 nm to 30 nm. In a case in which the volume average particle diameter is 2 nm or more, production suitability is enhanced, and in a case in which the volume average particle diameter is 70 nm or less, resistance to local blocking is improved.

The particle diameter distribution of the self-dispersing polymer particles is not particularly limited, and may be either a broad particle diameter distribution or a monodisperse particle diameter distribution. Further, a mixture of two or more kinds of water-insoluble particles may be used.

The average particle diameter and the particle diameter distribution of the self-dispersing polymer particles are determined by measuring the volume average particle diameters by means of a dynamic light scattering method, using a NANOTRAC particle size distribution measuring instrument UPA-EX150 (trade name, manufactured by NIKKISO Co., Ltd.).

The glass transition temperature (Tg) of the self-dispersing polymer is preferably 70° C. or more, more preferably 80° C. or more, and still more preferably 100° C. or more. In a case in which the glass transition temperature (Tg) is 70° C. or more, resistance to local blocking is improved. The upper limit of the glass transition temperature (Tg) is not particularly limited.

The polymer particles may be used singly, or in mixture of two or more kinds thereof.

The content of the polymer particles in the ink composition with respect to the ink composition is preferably 1% by mass to 30% by mass, and more preferably from 5% by mass to 15% by mass in terms of the solid content, from the viewpoints of the aggregation speed and gloss of the image.

The ratio of the pigment with regard to the polymer particles (for example, water insoluble pigment particles/self-dispersing polymer particles) is preferably from 1/0.5 to 1/10, and more preferably from 1/1 to 1/4, from the viewpoint of the abrasion resistance of the image.

While the self-dispersing polymer particles are described as an example of the preferable polymer particles in the above, the example is not limited to the self-dispersing polymer particles and other polymer particles may be used. For example, polymer particles such as a generally known emulsion polymer latex may also be appropriately used by adjusting a constituting monomer thereof, an emulsifying agent, a dispersion condition, and the like.

Water-Soluble Organic Solvent

The ink composition according to the invention may include a water-soluble organic solvent other than the specific amide compound. By incorporating the water-soluble organic solvent, the effects of preventing drying and moisturizing or promoting penetration to paper of the ink composition can be obtained.

Examples of the water-soluble organic solvent that may be contained in the ink composition include polyhydric alcohols such as glycols (e.g., glycerin, 1,2,6-hexanetriol, trimethylolpropane, ethylene glycol, propylene glycol, diethylene glycol, triethylene glycol, tetraethylene glycol, pentaethylene glycol, dipropylene glycol) or alkanediols (e.g, 2-butene-1,4-diol, 2-ethyl-1,3-hexanediol, 2-methyl-2,4-pentanediol, 1,2-octanediol, 1,2-hexanediol, 1,2-pentanediol, 4-methyl-1,2-pentanediol); and sugars, sugar alcohols, hyaluronic acids, alkyl alcohols having from 1 to 4 carbon atoms, glycol ethers, 2-pyrrolidone, and N-methyl-2-pyrrolidone described in paragraph [0116] of JP-A No. 2011-42150. These solvents may be used by appropriately selecting single type or two or more types thereof. The polyhydric alcohols are effective as a drying prevention agent or a wetting agent, and examples thereof include specific examples described in paragraph [0117] of JP-A No. 2011-42150. The polyol compound is preferable as a penetrating agent and examples thereof include aliphatic diols such as specific examples described in paragraph [0117] of JP-A No. 2011-42150.

Other than the above, examples of the water-soluble organic solvent include a compound represented by the following structural formula (1).

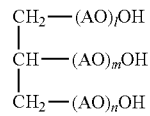

Structural formula (1)

In structural formula (1), each of l, m, and n independently represents an integer of 1 or more; and satisfies l+m+n=3 to 15. In a case in which l+m+n is 3 or more, curling inhibition effect can be obtained, and in a case in which l+m+n=15 or less, favorable ejection characteristics can be maintained. In particular, l+m+n is preferably from 3 to 12, and more preferably from 3 to 10. In structural formula (1), AO represents ethyleneoxy (sometimes abbreviated to EO) and/or propyleneoxy (sometimes abbreviated to PO), and particularly, a propyleneoxy group is preferable. Each AO of $(AO)_l$, $(AO)_m$, and $(AO)_n$ may be the same as or different from each other.

The details of the compound represented by structural formula (1) are described in paragraphs [0121] to [0125] of JP-A No. 2011-42150. The glycerin alkylene oxide adduct may be a commercially available product on the market, and examples thereof include a polyoxypropylated glycerin (an ether of polypropylene glycol and glycerin) such as SANNIX GP-250 (average molecular weight of 250), SANNIX GP-400 (average molecular weight of 400), and SANNIX GP-600 (average molecular weight of 600) (all manufactured by Sanyo Chemical Industries, Ltd), and the examples disclosed in paragraph [0126] of JP-A No. 2011-42150.

Other Components

The ink composition according to the invention may further include other additives in addition to the above-described components.

Examples of the other additives include known additives such as a polymerization inhibitor, an anti-drying agent (wetting agent), an anti-fading agent, an emulsion stabilizer, a penetration promoting agent, an ultraviolet absorbent, a preservative, an antifungal agent, a pH-adjusting agent, a surface tension adjusting agent, an anti-foaming agent, a viscosity adjusting agent, a dispersion stabilizer, an anti-corrosive agent, and a chelating agent. In general, the additive is directly added to the ink in the case of the ink composition, and the additive is added to a dispersion after the preparation of a dye dispersion in a case in which an oil-based dye is used as a dispersion. Alternatively, the additive may be added in the oil phase or the water phase at the time of the preparation.

In order to suppress bleeding by acid aggregation and achieve high resolution, it is preferable that the ink composition according to the invention is basic. From the viewpoint of high-temperature stability over time (resistance to hydrolysis of a polymerization material acrylamide) of the ink, it is preferable that the ink composition according to the invention is near-neutral.

More specifically, the pH of the ink composition is preferably from pH 5 to pH 10. The pH of the ink composition is more preferably from pH 8.0 to pH 9.0. From the viewpoint of reducing a burden to a member used for image forming, the pH of the ink composition is still more preferably less than pH 9.

As described above, the ink composition according to the invention with the above constitution has an excellent stability over time under low temperature, and precipitation of the polymerization initiator can be suppressed even when the ink composition is stored in a low-temperature environment for long period. As a result, the polymerizable compound in the ink composition exhibits high curing reactivity and the polymerizable compound tends to be rapidly cured when the ink composition is irradiated with active energy rays. Furthermore, due to the suppressed precipitation of the polymerization initiator, the increase in viscosity of the ink composition can be suppressed. Accordingly, in a case in which the ink composition is used as the ink jet ink, the ejection of the ink composition from an ink jet nozzle can be easily achieved and therefore ejection stability of the ink is excellent.

In addition, the specific amide compound included in the ink composition is a compound that has a reduced environmental burden and has a reduced odor among various solvents. Therefore, the ink composition can be prepared as an environment-conscious product in which the odor is reduced.

Ink Set

The ink set according to the invention includes the above-described ink composition according to the invention and a treatment liquid that contains an aggregation component capable of forming an aggregate when brought into contact with the ink composition.

Since the ink set according to the invention uses the ink composition according to the invention, a fine image having an excellent abrasion resistance can be formed.

The details of the ink composition are as described above.

Treatment Liquid

Hereinbelow, the details of the treatment liquid for constituting the ink set are described.

When the treatment liquid applied to a recording medium is brought into contact with the ink composition, the dispersed particles such as the pigment and the polymer particles in the ink composition are aggregated to fix an image on the recording medium. The treatment liquid contains at least an aggregation component for aggregating the components present in the ink composition, and may further contain the polymerization initiator. The treatment liquid may further contain other components if necessary. The speed of ink-jet recording can be increased by the use of the treatment liquid in combination with the ink composition, and an image having an excellent drawing property (for example, reproducibility of a fine line and a minute part) with high density and high resolution can be obtained even in the case of high speed recording.

The aggregation component may be a compound capable of changing the pH of the ink composition, a polyvalent metal salt, or a polymer having a quaternary or tertiary amine such as a polyallylamine. In the invention, from the viewpoint of aggregation properties of the ink composition, the aggregation component is preferably a compound capable of changing the pH of the ink composition, and more preferably a compound capable of decreasing the pH of the ink composition.

Examples of the compound capable of decreasing the pH of the ink composition include an acidic substance.

Examples of the acidic substance include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, and derivatives of these compounds and salts thereof.

The acidic substance may be used singly, or in combination of two or more kinds thereof.

In a case in which the treatment liquid according to the invention contains the acidic substance, the pH (at 25° C.) of the treatment liquid is preferably 6 or less, and more preferably 4 or less. In particular, the pH (at 25° C.) of the treatment liquid is preferably in a range of from 1 to 4, and more preferably in a range of from 1 to 3. In this case, the pH (at 25° C.) of the ink composition is preferably 7.5 or more (more preferably 8.0 or more).

From the viewpoints of image density, resolution, and increasing the speed of ink jet recording, it is preferable that the pH (25° C.) of the ink composition is 8.0 or more and the pH (25° C.) of the treatment liquid is from 0.5 to 4.

The aggregation component in the invention is preferably an acidic substance having high solubility in water. From the viewpoints of improving aggregation properties and fixing the entire ink, the aggregation component is preferably an organic acid, more preferably an organic acid having a valence of 2 or more, and still more preferably an acidic substance having a valence of from 2 to 3. The organic acid having a valence of 2 or more is preferably an organic acid having a first pKa of 3.5 or less, and more preferably an acidic substance having a first pKa thereof of 3.0 or less. Specific examples thereof include phosphoric acid, oxalic acid, malonic acid, and citric acid.

Examples of the polyvalent metal salt include salts of alkaline earth metals belonging to Group II of the periodic table (for example, magnesium and calcium), transition metals belonging to Group III of the periodic table (for example, lanthanum), cations from Group XIII of the periodic table (for example, aluminum), and lanthanides (for example, neodymium). Preferable examples of the salts of the metals include carboxylic acid salts (such as formates, acetates, and benzoates), nitrates, chlorides, and thiocyanates. Among these, calcium salts or magnesium salts of carboxylic acids (such as formates, acetates, and benzoates), calcium salts or magnesium salts of nitric acid, calcium chloride, magnesium chloride, and calcium salts or magnesium salts of thiocyanic acid are more preferable.

The aggregation component may be used singly, or in mixture of two or more kinds thereof.

The content of the aggregation component for aggregating the ink composition in the treatment liquid is preferably from 1% by mass to 50% by mass, more preferably from 3% by mass to 45% by mass, and still more preferably from 5% by mass to 40% by mass.

The treatment liquid may contain at least one polymerization initiator, which is also contained in the ink composition, for initiating polymerization of the polymerizable compound in the ink composition by the active energy ray. The polymerization initiator may be used singly, in mixture of two or more kinds thereof, or together with a sensitizer.

Similarly to the ink composition, the polymerization initiator used in the treatment liquid may be appropriately selected from compounds capable of initiating a polymerization reaction of the polymerizable compound by the active energy ray. Examples of the polymerization initiator include a polymerization initiator (for example, a photopolymerization initiator) that generates active species (such as a radical, an acid, or a base) on exposure to radiation or light, or an electron beam. The details of the photopolymerization initiator are as described above with respect to the ink composition.

The treatment liquid may further contain other additives as other components within the range in which the effect of the invention is not impaired. Examples of the other additives include known additives such as an anti-drying agent (wetting agent), an anti-fading agent, an emulsification stabilizer, a penetration promoting agent, an ultraviolet absorbent, a preservative, an antifungal agent, a pH-adjusting agent, a surface tension adjusting agent, an anti-foaming agent, a viscosity adjusting agent, a dispersant, a dispersion stabilizer, an anti-corrosive agent, and a chelating agent.

Image Forming Method

The image forming method according to the invention includes an ink applying process of applying the above-described ink composition according to the invention to a recording medium by an ink jet method, thereby forming an image. By the use of the ink composition according to the invention in the image forming method according to the invention, a fine image having excellent abrasion resistance can be obtained in various temperature environments including a low-temperature environment.

Ink Applying Process

In the ink applying process, the above-described ink composition according to the invention is applied to a recording medium by an ink jet method. In this process, the ink composition can be selectively applied to the recording medium so that a desired visible image can be formed. The details of the ink composition and preferable embodiments of the ink composition are as described above with respect to the ink composition.

In the image formation using the ink jet method, the ink composition is ejected to a desired recording medium by imparting energy to form a colored image. Here, as the ink jet method which is preferable in the invention, a method described in paragraphs [0093] to [0105] of JP-A No. 2003-306623 can be used.

The ink jet method is not particularly limited and may be of any known system, for example, a charge control system of ejecting an ink by using an electrostatic attraction force, a drop on demand system of utilizing a vibration pressure of a piezo element (pressure pulse system), an acoustic ink jet system of converting electric signals into acoustic beams, irradiating them to an ink, and ejecting the ink by utilizing a radiation pressure, and a thermal ink-jet system of heating an ink to form bubbles and utilizing the resultant pressure (BUBBLEJET (registered trade mark)). As the ink jet method, in particular, in a method disclosed in JP-A No. S54-59936, it is possible to effectively use an ink jet method in which a rapid change in volume is generated in an ink that receives the action of heat energy and the ink is ejected from a nozzle using the action force due to the change in states.

Examples of the ink jet method include a system of injecting a number of ink droplets of low concentration, a so-called "photo-ink" each in a small volume, a system of improving an image quality by using plural kinds of inks of a substantially identical hue but different densities, and a system of using a colorless transparent ink.

Examples of the ink jet head include those of a shuttle system in which recording is performed using a short serial head while scanning the head in the width direction of a recording medium and those of a line system using a line head in which recording devices are arranged with respect to the full width of a recording medium. In the line system, image recording can be performed throughout the surface of the recording medium by scanning the recording medium in the direction orthogonal to the arrangement direction of the recording devices, and therefore conveyance systems for scanning the short head, such as a carriage, is unnecessary. Furthermore, since complicated scanning control for the movement of the carriage and the recording medium is unnecessary and only the recording medium is moved, higher recording speed compared to the shuttle system can be attained. While the image forming method according to the invention is applicable to any one of them, the effect of improving the ejection accuracy and the abrasion resistance of the image is remarkable when the method is applied to the line system in which dummy ejection is not usually performed.

From the viewpoint of obtaining high definition images, the amount of an ink droplet ejected from an ink-jet head is preferably in a range of from 1 pl to 10 pl (picoliters), and more preferably from 1.5 pl to 6 pl. From the viewpoints of improving image unevenness and continuity in tone, ejection with a combination of different droplet amounts is also effective. The invention can also be preferably used in these cases.

Treatment Liquid Applying Process

It is preferable that the image forming method according to the invention further include a treatment liquid applying process of applying to a recording medium a treatment liquid that includes an aggregation component that forms an aggregate when brought into contact with the ink composition.

In the treatment liquid applying process, a treatment liquid that contains an aggregation component for aggregating the component in the ink composition is applied to a recording medium, so that the treatment liquid is brought into contact with the ink composition to form an image. In this case, the dispersed particles such as the pigment and the polymer particles in the ink composition are aggregated to fix an image on the recording medium. The treatment liquid contains at least the aggregation component, and the details of each component and preferable embodiments are as described above.

The treatment liquid may be applied using a known method such as a coating method, an ink-jet method, or a dip method. Examples of the coating method to be conducted include a known coating method using a bar coater, an extrusion die coater, an air doctor coater, a blade coater, a rod coater, a knife coater, a squeeze coater, a reverse roll coater, or a bar coater. The details of the ink-jet method are as described above.

The treatment liquid applying process may be conducted either before or after the ink applying process using the ink composition. In the invention, an embodiment is preferable in which the ink applying process is conducted after applying the treatment liquid in the treatment liquid applying process. Specifically, a preferable embodiment is that a treatment liquid for aggregating the dispersed particles such as the pigment and/or the self-dispersing polymer particles in the ink composition is applied to a recording medium in advance of the application of the ink composition, and then the ink composition is applied in such a manner that the ink composition is brought into contact with the treatment liquid applied to the recording medium, thereby forming an image. Thus, an ink jet recording speed can be increased and therefore images with high density and high resolution can be obtained even in the case of high speed recording.

The application amount of the treatment liquid is not particularly limited as long as the ink composition can be aggregated, and is preferably set to an amount such that the application amount of the aggregation component is 0.1 g/m$^2$ or more. In particular, the application amount of the aggregation component is preferably from 0.2 g/m$^2$ to 0.7 g/m$^2$. In a case in which the application amount of the aggregation component is 0.1 g/m$^2$ or more, favorable high speed aggregation properties can be maintained according to various application forms of the ink composition. In a case in which the application amount of the aggregation component is 0.7 g/m or less, it is preferable in that there are no adverse effects (changes in gloss) on surface properties of the recording medium to which the aggregation component is applied.

In the invention, it is preferable to conduct the ink applying process after the treatment liquid applying process, and further conduct a heating and drying process for heating and drying the treatment liquid on the recording medium after applying the treatment liquid on the recording medium but before applying the ink composition. In a case in which the treatment liquid is dried by heating in advance of the ink applying process, favorable ink coloring properties, such as prevention of bleeding, can be obtained, and thus a visible image having a favorable color density and a favorable hue can be recorded.

The heating and drying may be performed with a known heating means, such as a heater, or an air blowing means utilizing blowing of air, such as a drier, or a means having a combination thereof. Examples of the heating method include: a method of applying heat to the side of the recording medium opposite to the side thereof on which the treatment liquid has been applied, using a heater or the like; a method of blowing a warm or hot air to the surface of the recording medium on which the treatment liquid has been applied; a heating method using an infrared heater; and a combination of two or more of these methods.

Recording Medium

In the image forming method according to the invention, an image is recorded on a recording medium. The recording medium is not particularly limited, and may be a cellulose-based general printing paper, such as so-called high-quality paper, coated paper, or art paper, which is used for general offset printing and the like. When image recording is performed on the cellulose-based general printing paper by a general ink-jet method using an aqueous ink, absorption and drying of the ink is relatively slow, migration of a coloring material easily occurs after ink application, and image quality tends to lower. In contrast, according to the image forming method of the invention, high-quality image recording having excellent color density and hue can be achieved while suppressing the migration of the colorant.

As the recording medium, a commercially available product can be used, and examples thereof include high-quality papers (A) such as "OK PRINCE HIGH-QUALITY" manufactured by Oji Paper Co., Ltd., "SHIORAI" manufactured by Nippon Paper Industries Co., Ltd., or "NEW NPI HIGH-QUALITY" manufactured by Nippon Paper Industries Co., Ltd., fine coated papers such as "OK EVER LIGHT COAT" manufactured by Oji Paper Co., Ltd., or "AURORA S" manufactured by Nippon Paper Industries Co., Ltd., light-weight coat papers (A3) such as "OK COAT L" manufactured by Oji Paper Co., Ltd., or "AURORA L" manufactured by Nippon Paper Industries Co., Ltd., coat papers (A2, B2) such as "OK TOP COAT+" manufactured by Oji Paper Co., Ltd., or "AURORA COAT" manufactured by Nippon Paper Industries Co., Ltd., and art papers (A1) such as "OK KINFUJI+" manufactured by Oji Paper Co., Ltd., "TOKUBISHI ART" manufactured by Mitsubishi Paper Mills Ltd. As the recording medium, various ink jet recording papers exclusively for photos can also be used.

As the recording media, it is preferable to use a so-called coated paper that is used in general offset printing and the like. The coated paper is provided with a coating layer by coating a coating material on a surface of cellulose-based high-quality paper or medium-quality paper that has not typically been surface treated. When image forming is performed by conventional ink jetting with an aqueous ink, the coated paper tends to cause problems in quality, for example, in image gloss or abrasion resistance. However, according to the image forming method of the invention, unevenness in gloss is suppressed and an image having excellent gloss and excellent abrasion resistance can be obtained even when the coated paper is used. In particular, it is preferable to use coated paper including a base paper and a coated layer containing an inorganic pigment, and more preferable to use coated paper including a base paper and a coated layer containing kaolin and/or calcium bicarbonate. More specifically, art paper, coated paper, light-weight coated paper, or very light-weight coated paper are more preferable.

Ink-jet Recording Apparatus

Next, a preferable example of an ink jet recording apparatus used for the image forming method according to the invention is explained in detail with reference to FIG. 1. FIG. 1 is a schematic diagram showing an example of a structure of the entire ink jet recording apparatus.

As shown in FIG. 1, the ink jet recording apparatus includes: a treatment liquid application unit 12, having a treatment liquid ejection head 12S that ejects the treatment liquid; a treatment liquid drying zone 13, having a heating means (not shown) that dries the applied treatment liquid; an ink ejection unit 14 that ejects various ink compositions; and an ink drying zone 15 at which the ejected ink composition is dried, in this order in the conveyance direction of the recording medium (the direction of the arrow shown in the FIGURE). Further, an ultraviolet irradiating unit 16 having an ultraviolet irradiating lamp 16S is provided at a downstream side of the ink drying zone 15 in the conveyance direction of the recording medium.

The recording medium that has been supplied to the ink jet recording apparatus is conveyed by conveyance rollers from a paper feed section, which feeds recording medium from a case in which the recording media are loaded, to the treatment liquid application unit 12, then to the treatment liquid drying zone 13, then to the ink ejection unit 14, then to the ink drying zone 15, and then to the ultraviolet irradiating unit 16, and then accumulated in an accumulation section. The conveyance of the recording medium may be conducted by a method using conveyance rollers, or a drum conveyance method using a drum-shaped member, a belt conveyance method, or a stage conveyance method using a stage.

Among the plural conveyance rollers arranged in the ink jet recording apparatus, at least one roller may be a drive roller to which the force generated by a motor (not shown) is transmitted. By rotating the drive roller at a constant rate using the motor, the recording medium is conveyed in a predetermined direction, by a predetermined conveyance amount.

The treatment liquid application unit 12 has a treatment liquid ejection head 12S, which is connected to a storage tank in which the treatment liquid is stored. The treatment liquid ejection head 12S ejects the treatment liquid from ejection nozzles disposed to face the recording surface of the recording medium so that droplets of the treatment liquid can be applied to the recording medium. The method used in the treatment liquid application unit 12 is not limited to a method of ejecting from a head in the form of a nozzle, and may be a coating method using a coating roller. According to the coating method, the treatment liquid may be readily applied to almost the entire surface of the recording medium, including an image portion on which ink droplets are to be applied by the ink ejection unit 14 provided at the downstream side. In order to uniformize the thickness of the treatment liquid applied to the recording medium, there may be used an air-knife, or a method of providing a member having an acute angle to provide a gap between the member and the recording medium that corresponds to the predetermined amount of treatment liquid.

The treatment liquid drying zone 13 is positioned at a downstream side of the treatment liquid application unit 12 in the conveyance direction of the recording medium. The treatment liquid drying zone 13 may include a known heating means such as a heater; an air blowing means such as a drier; or a means of a combination thereof. The heating means may utilize, for example, a method in which a heat generating member such as a heater is disposed on the side opposite to a recording surface side of the recording medium (for example, below a conveying mechanism on which a recording medium is placed and conveyed in a case of automatically conveying the recording medium); a method in which a warm air or a hot air is applied to the recording surface of the recording medium; or a heating method of using an infrared heater. The heating may be conducted by using a combination of two or more of these methods.

Since the surface temperature of the recording medium may vary depending on the type (material, thickness, or the like) of the recording medium, the environmental temperature and the like, it is preferable to heat while regulating the temperature by providing a measurement section that measures the surface temperature of the recording medium and a control mechanism for feeding back the value of the thus-measured surface temperature of the recording medium to the heating control section. The measurement section for measuring the surface temperature of the recording medium is preferably a contact-type or non-contact type thermometer.

The solvent may be removed using a solvent-removing roller or the like. Alternatively, a method in which excess solvent is removed from the recording medium by an air knife is also applicable.

The ink ejection unit 14 is positioned at a downstream side of the treatment liquid drying zone 13 in the conveyance direction of the recording medium. The ink ejection unit 14 includes recording heads (ink ejection heads) 30K, 30C, 30M, and 30Y, which are connected to ink reservoirs that store inks of black (K), cyan (C), magenta (M) and yellow (Y), respectively. Each ink reservoir (not shown) stores an ink composition containing a pigment of a corresponding color, polymer particles, a water-soluble organic solvent, and water, and supplies in accordance with necessity the ink composition to the corresponding head among the ink ejection heads 30K, 30C, 30M, and 30Y, when image recording is performed. Further, as shown in FIG. 1, recording heads 30A and 30B for ejecting inks of specific colors may be further provided, which are positioned at a downstream side of the ink ejection heads 30K, 30C, 30M, and 30Y in the conveyance direction of the recording medium, such that the recording heads 30A and 30B can jet the inks having specific colors in accordance with necessity.

The ink ejection heads 30K, 30C, 30M, and 30Y eject inks according to the images to be formed, through ejection nozzles that are positioned so as to face the recording surface of the recording medium. In this way, inks of the respective colors are applied to the recording surface of the recording medium to record a color image.

The treatment liquid ejection head 12S and the ink ejection heads 30K, 30C, 30M, 30Y, 30A, and 30B are each in the form of full-line head in which a number of ejection ports (nozzles) are aligned along the maximum recording width of the image to be recorded on the recording medium. In this form, image recording on a recording medium can be carried out at higher speed compared to serial-type recording in which recording is carried out using a short shuttle head that reciprocates in the width direction of the recording medium (in a direction on the plane of the recording medium that is perpendicular to the conveyance direction of the recording medium) while performing scanning. In the invention, either of the serial-type recording method or a recording method capable of recording at relatively high speed, such as a single-path system which is capable of recording by ejection in the main scanning direction in single-path manner where a line is formed at a single round of scanning, may be employed. In the image recording method according to the invention, a high-quality image having high reproducibility may be obtained even in the single-path system.

Here, the treatment liquid ejection head 12S and the ink ejection heads 30K, 30C, 30M, 30Y, 30A, and 30B each have the same structure.

The application amount of the treatment liquid and the application amount of the ink composition are preferably regulated in accordance with necessity. For example, the amount of the treatment liquid may be changed according to the type of the recording medium, in order to adjust the properties such as viscoelasticity of an aggregate formed when mixing the treatment liquid and the ink composition.

The ink drying zone 15 is positioned at a downstream side of the ink ejection unit 14 in the conveyance direction of the recording medium. The ink drying zone 15 may have a structure similar to that of the treatment liquid drying zone 13.

The ultraviolet irradiating unit 16 is further disposed at a downstream side of the ink drying zone 15 in the conveyance direction of the recording medium. The ultraviolet irradiating unit 16 is configured to irradiate ultraviolet rays by means of the ultraviolet irradiating lamp 16S provided in the ultraviolet irradiating unit 16 and polymerize and cure monomer components present in an image after drying of the image. The ultraviolet irradiating lamp 16S is configured to irradiate the entire recording surface by means of a lamp disposed to face the recording surface of the recording medium and perform curing of the entire image. Here, the ultraviolet irradiating unit 16 may adopt a halogen lamp, a high-pressure mercury lamp, a laser, an LED, an electron ray irradiating apparatus or the like, in place of the ultraviolet irradiating lamp 16S.

The ultraviolet irradiating unit 16 may be disposed at a downstream or upstream side of the ink drying zone 15, or may be disposed at each of the downstream and upstream sides of the ink drying zone 15.

The ink jet recording apparatus may further include a heating means at the conveyance path from the feed section to the accumulation section, in order to conduct a heat treatment on the recording medium. For example, by providing a heating means at a desired position, such as at an upstream side of the treatment liquid drying zone 13 or between the ink ejection unit 14 and the ink drying zone 15, the temperature of the recording medium can be increased to a desired temperature, so that drying and fixing is performed effectively.

EXAMPLES

Hereinafter, the invention is described more specifically with reference to the examples, but the invention is not limited to these examples to the extent not impairing the spirit of the invention. Here, "part(s)" and "%" are based on mass unless otherwise specified.

Preparation of Solution of Polymer Dispersant 1

6 parts of styrene, 11 parts of stearyl methacrylate, 4 parts of styrene macromer AS-6 (manufactured by Toagosei Co., Ltd.), 5 parts of BLENMER PP-500 (manufactured by NOF Corporation), 5 parts of methacrylic acid, 0.05 parts of 2-mercaptoethanol, and 24 parts of methyl ethyl ketone were added into a reaction vessel, thereby preparing a mixed solution.

Independently, 14 parts of styrene, 24 parts of stearyl methacrylate, 9 parts of styrene macromer AS-6 (manufactured by Toagosei Co., Ltd.), 9 parts of BLENMER PP-500 (manufactured by NOF Corporation), 10 parts of methacrylic acid, 0.13 parts of 2-mercaptoethanol, 56 parts of methyl ethyl ketone, and 1.2 parts of 2,2'-azobis(2,4-dimethylvaleronitrile) were added into a dropping funnel, thereby preparing a mixed solution.

Subsequently, the mixed solution in the reaction vessel was heated to 75° C. while stirred under a nitrogen atmosphere, and the mixed solution in the dropping funnel was slowly added dropwise over one hour. Two hours after the completion of dropwise addition, a solution in which 1.2 parts of 2,2'-azobis(2,4-dimethylvaleronitrile) was dissolved in 12 parts of methyl ethyl ketone was added dropwise thereto over 3 hours and was aged for 2 hours at 75° C. and aged for 2 hours at 80° C., thereby obtaining a solution of polymer dispersant 1.

A portion of the obtained solution of polymer dispersant 1 was isolated by removing the solvent. The obtained solid was diluted with tetrahydrofuran to be 0.1%, and the weight average molecular weight of the polymer dispersant was measured by linking the three of TSKgeL Super HZM-H, TSKgeL Super HZ-4000, and TSKgeL Super HZ-2000 (manufactured by Tosoh Corporation) in series and using a high-speed GPC (gel permeation chromatography) HLC-8220 GPC (manufactured by Tosoh Corporation). The weight average molecular weight measured was 25,000 in terms of polystyrene conversion. The acid value of the polymer determined in accordance with JIS standard (JIS K0070: 1992) was 99 mg KOH/g.

Preparation of Pigment Dispersion Liquid M 5.0 g in terms of solid content of the solution of polymer dispersant 1, 10.0 g of magenta pigment (Pigment Red 122, manufactured by Dainichiseika Color & Chemicals Manufacturing Co., Ltd.), 40.0 g of methyl ethyl ketone, 8.0 g of 1 mol/L (L: liter, the same shall apply hereafter) of sodium hydroxide, and 82.0 g of ion exchanged water were added into a vessel together with 300 g of 0.1 mm zirconia beads, and the obtained mixture was dispersed for 6 hours at 1000 rpm with a ready mill dispersing machine (manufactured by Aimex Co., Ltd.). The obtained dispersion liquid was concentrated in an evaporator under reduced pressure until the methyl ethyl ketone was able to be sufficiently removed and was further concentrated until the concentration of the pigment was 10%, thereby preparing a pigment dispersion liquid M of a resin-coated magenta pigment.

The volume average particle diameter (secondary particles) of the obtained pigment dispersion liquid M was measured by a dynamic light scattering method using a MICROTRAC particle size distribution analyzer (trade name: Version 10.1.2-211BH, manufactured by Nikkiso Co., Ltd.) and found to be 84 nm.

Preparation of Pigment Dispersion Liquid Y

A pigment dispersion liquid Y of a resin-coated yellow pigment was obtained in a manner similar to the preparation of the pigment dispersion liquid M, except that Irgalite Yellow GS (Pigment Yellow 74, manufactured by BASF Japan Co., Ltd.) was used instead of Pigment Red 122 as the pigment. The volume average particle diameter (secondary particles) of the pigment dispersion liquid Y measured in a manner similar to the pigment dispersion liquid M was 75 nm.

Preparation of Pigment Dispersion Liquid K

A pigment dispersion liquid K of a resin-coated black pigment was obtained in a manner similar to the preparation of the pigment dispersion liquid M, except that Carbon Black MA-100 (manufactured by Mitsubishi Chemical Corporation) was used instead of Pigment Red 122 as the pigment. The volume average particle diameter (secondary particles) of the pigment dispersion liquid K measured in a manner similar to the pigment dispersion liquid M was 80 nm.

Preparation of Pigment Dispersion Liquid C

As a pigment dispersion liquid C, CABO-JET250C (Pigment Blue 15:4 (PB 15:4), a cyan pigment dispersion liquid manufactured by Cabot Corporation) was prepared. The pigment dispersion liquid C is a pigment dispersion liquid of a resin-coated cyan pigment in which PB 15:4 is coated with a resin. The volume average particle diameter (secondary particles) of the pigment dispersion liquid C measured in a manner similar to the pigment dispersion liquid M was 110 nm.

Synthesis of Polyvalent (meth)acrylamide M-1

First Process 121 g (1 equivalent) of tris(hydroxymethyl)aminomethane (manufactured by Tokyo Kasei Kogyo Co., Ltd.), 84 ml of 50% potassium hydroxide aqueous solution, and 423 ml of toluene were added to a 1 L three-neck flask provided with a stirrer bar, and stirred. While maintaining the resultant at 20° C. to 25° C. in a reaction system in a water bath, 397.5 g (7.5 equivalents) of acrylonitrile were added dropwise thereto over 2 hours. After the dropwise addition, the resultant was stirred for 1.5 hours. Thereafter, 540 ml of toluene was added to the reaction system, and the reaction mixture was transferred to a reparatory funnel and an aqueous layer was removed. After drying the remaining organic layer over magnesium sulfate, Celite filtration was performed and the solvent was distilled off under reduced pressure, thereby obtaining an acrylonitrile adduct. Since the analysis results according to $^1$H-NMR, MS of the obtained material was fully consistent with known compounds, the material was used in the following reduction reaction without further purification.

Second Process 24 g of the obtained acrylonitrile adduct, 48 g of a Ni catalyst (Raney nickel 2400, manufactured by W. R. Grace & Co. Ltd.), and 600 ml of 25% ammonia aqueous solution (water:methanol=1:1) were added to an autoclave with a volume of 1 L, the mixture was suspended, and then the reaction vessel was sealed. Hydrogen of 10 MPa was introduced into the reaction vessel, and a reacted for 16 hours with a reaction temperature of 25° C.

The disappearance of the raw material was confirmed by $^1$H-NMR, the reaction mixture was filtered with Celite, and the Celite was washed several times with methanol. By distilling off the solvent from the filtrate under reduced pressure, a polyamine body was obtained. The obtained material was used in the next reaction without further purification.

Third Process 30 g of the obtained polyamine body, 120 g (14 equivalents) of NaHCO$_3$, 1 L of dichloromethane, and 50 ml of water were added to a three-neck flask with a volume of 2 L provided with a stirrer, and 92.8 g (10 equivalents) of acrylic acid chloride were added dropwise thereto over 3 hours in an ice bath. Thereafter, the mixture was stirred at room temperature for 3 hours. The disappearance of the raw material was confirmed by $^1$H-NMR, and then the solvent was distilled off from the reaction mixture under reduced pressure. Subsequently, the reaction mixture was dried over magnesium sulfate, Celite filtering was performed, and the solvent was then distilled off under reduced pressure. Finally, by performing purification with column chromatography (ethyl acetate/methanol=4:1), a solid of polyvalent (meth)acrylamide M-1 was obtained at ambient temperature. The yield of the polyvalent (meth)acrylamide M-1 obtained through the above-described three processes was 40%.

Here, the polyvalent (meth)acrylamide M-1 is a compound having the following structure in which $R^1=H$, $R^2=C_3H_6$, $R^3=CH_2$, $X=Y=Z=0$ in Formula (2).

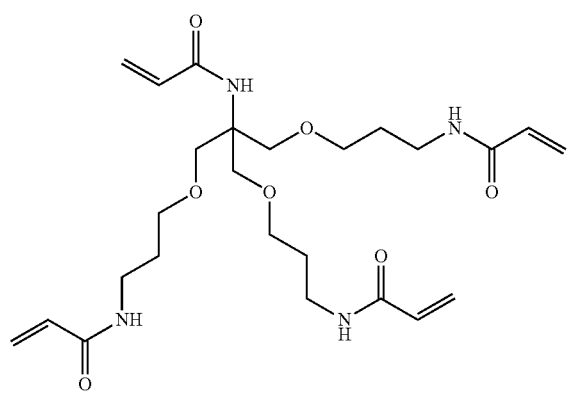

M-1

Preparation of Self-Dispersing Polymer Particles P-1

360.0 g of methyl ethyl ketone was added to a 2 liter three-necked flask provided with a stirrer, a thermometer, a reflux condenser, and a nitrogen gas introducing tube, followed by heating up to 75° C. Thereafter, while maintaining the temperature inside the flask at 75° C., a mixed solution of 180.0 g of phenoxyethyl acrylate, 162.0 g of methyl methacrylate, 18.0 g of acrylic acid, 72 g of methyl ethyl ketone, and 1.44 g of "V-601" (manufactured by Wako Pure Chemical Industries, Ltd.) was added dropwise thereto at a constant speed such that the dropwise addition was completed in two hours. After the completion of the dropwise addition, a solution containing 0.72 g of "V-601" and 36.0 g of methyl ethyl ketone was added thereto followed by stirring at 75° C. for 2 hours. Furthermore, a solution containing 0.72 g of "V-601" and 36.0 g of isopropanol was added thereto followed by stirring at 75° C. for 2 hours, and heated to 85° C. followed by stirring for another 2 hours, thereby obtaining a resin solution of a phenoxyethyl acrylate/methyl methacrylate/acrylic acid (=50/45/5 [mass ratio]) copolymer.

The weight average molecular weight (Mw) of the obtained copolymer measured in a manner similar to the polymer dispersant 1 was 64,000 (calculated by polystyrene conversion using gel permeation chromatography (GPC)) and the acid value thereof was 38.9 mgKOH/g.

Subsequently, 668.3 g of the obtained resin solution was weighed, 388.3 g of isopropanol and 145.7 ml of 1 mol/L NaOH aqueous solution were added thereto, and the temperature inside the reaction vessel was raised to 80° C. Thereafter, 720.1 g of distilled water was added dropwise thereto at a speed of 20 ml/minute to perform water dispersion, the temperature inside the reaction vessel was kept at 80° C. for 2 hours, at 85° C. for 2 hours, and at 90° C. for 2 hours under atmospheric pressure, and then the inside of the reaction vessel was depressurized to distill away a total of 913.7 g of isopropanol, methyl ethyl ketone, and distilled water, whereby an aqueous dispersion P-1 of self-dispersing polymer particles having a solid content concentration of 28.0% was obtained.

Preparation of Ink Composition

After mixing the components shown in the following Table 1, coarse particles were removed through a membrane filter (pore size 5 μm), thereby preparing ink compositions 1 to 24. Here, "-" in the table represents "not contained".

The pH of the ink compositions 1 to 24 was the value measured with a pH meter WM-50EG manufactured by DKK-Toa Corporation while controlling the temperature to 25° C.

The "a/b" indicated at the "solvent" column represents a ratio (a/b) of mass (a) of each of specific amide compounds S-1 to S-4 to mass (b) of a polymerization initiator.

The details of the components in Table 1 are as follows.

Polymerizable Compound

HEAA: Hydroxyethylacrylamide (manufactured by Kohjin co., Ltd.)

A-400: Polyethylene glycol 400 diacrylate (manufactured by Shin-Nakamura Chemical Co., Ltd.)

M-1: Polyvalent (meth)acrylamide M-1 obtained by the above-described synthesis

M-2: Polymerizable compound 1 described above

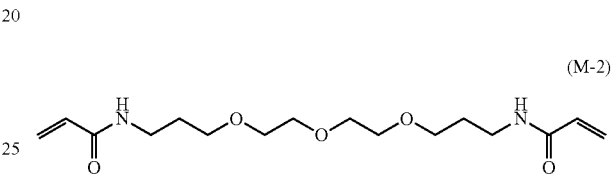

(M-2)

Surfactant

E1010: Olfine E1010 (manufactured by Nissin Chemical Industry Co., Ltd.)

Polymerization Initiator

Irg 2959: IRGACURE 2959 (manufactured by BASF Japan Co., Ltd.)

Irg 907: IRGACURE 907 (manufactured by BASF Japan Co., Ltd.)

Irg 369: IRGACURE 369 (manufactured by BASF Japan Co., Ltd.)

Daro 1173: DAROCUR 1173 (manufactured by BASF Japan Co., Ltd.)

Solvent

S-1: 3-n-butoxy-N,N-dimethylpropionamide (exemplified compound A-2 of the specific amide compound)

S-2: 3-n-propoxy-N,N-dimethylpropionamide (exemplified compound A-17 of the specific amide compound)

S-3: 3-iso-propoxy-N,N-dimethylpropionamide (exemplified compound A-22 of the specific amide compound)

S-4: 3-methoxy-N,N-dimethylpropionamide (exemplified compound A-1 of the specific amide compound)

S-5: Sannix GP 250 (manufactured by Sanyo Chemical Industries, Ltd.)

Evaluation

1. Stability over time of ink composition under low temperature

Each of the ink compositions 1 to 24 was stored at 5° C. for 14 days, and then the precipitation of the polymerization initiator in the ink was visually confirmed. The stability over time of the ink under cool temperature was evaluated in accordance with the following evaluation criteria. The evaluation results are shown in Table 1.

Evaluation Criteria

A: no solid matter was observed

B: a small amount of solid matter of less than 1 mm was observed on the inner wall of the vessel, but the solid matter was disappeared by stirring C: a small amount of solid matter of 1 mm or more was observed on the inner wall of the vessel, and the solid matter was not disappeared by stirring D: a large amount of precipitates were observed 2. Ejection property of ink composition after storage under low temperature A GELJET GX5000 print head (manufactured by RICOH Company, Ltd.) was prepared, and fixed to an ink jet recording apparatus such that the direction (main-scanning direction) of a line head in which 96 nozzles are arranged is oriented to a direction perpendicular to the movement direction (sub-scanning direction) of a stage. Each of the ink compositions 1 to 24 stored at 5° C. for 14 days was filled into a storage tank connected to the print head.

As a recording medium, "Gasai Photofinishing Pro" (manufactured by Fujifilm Corporation) was prepared and fixed onto a stage that was movable in a direction (sub-scanning direction) perpendicular to the direction (main-scanning direction) of the print head in which the nozzles are arranged.

While the stage was moved in the conveyance direction (sub-scanning direction) at 211 mm/sec, the ink was ejected at 2000 droplets per nozzle under the conditions of the amount of ink droplets of 3.4 pL, an ejecting frequency of 10 kHz, and the nozzle arranged direction×the conveyance direction=75×1200 dpi (dot per inch), thereby printing 96 lines parallel to the conveyance direction. At this time, ejection of the ink from all of the nozzles was confirmed.

After the completion of the ejection of the ink composition, the print head was held for a predetermined time (for 5, 10, 15, 20, 25, 30, 35, 40, or 45 minutes) as it was. Subsequently, newly prepared recording medium was fixed to the stage, and the ink was ejected under the same condition as above, thereby printing lines. The ejection property (ejection recovery property) was evaluated according to the following evaluation criteria based on holding time after which the ejection of 2000 droplets can be achieved from all of the 96 nozzles. The longer holding time indicates better ejection property (ejection recovery property). The evaluation results are shown in Table 1.

Evaluation Criteria

A: The holding time after which the ejection of the ink composition can be achieved is 45 minutes or longer B: The holding time after which the ejection of the ink composition can be achieved is 20 minutes or longer and shorter than 45 minutes C: The holding time after which the ejection of the ink composition can be achieved is 10 minutes or longer and shorter than 20 minutes D: The holding time after which the ejection of the ink composition can be achieved is shorter than 10 minutes

TABLE 1

| Ink No. | pH | Pigment dispersion liquid (pigment solid content) | | | | Polymerizable compound | | | | Self-dispersing polymer (solid content) | Surfactant | Polymerization initiator (b) | | | | Solvent (a...S-1 to S-4) | | | | | a/b | Ion exchanged water | Evaluation | | Note |
|---|---|---|---|---|---|---|---|---|---|---|---|---|---|---|---|---|---|---|---|---|---|---|---|---|---|
| | | M | C | Y | K | HEAA | M-1 | M-2 | A-400 | P-1 | E1010 | Irg 2959 | Irg 907 | Irg 369 | Daro 1173 | S-1 | S-2 | S-3 | S-4 | S-5 | | | Low temp. stability | Ejection property after storage under low temp. | |
| 1 | 8.73 | 4 | — | — | — | 15 | 5 | — | — | 1 | 1 | 3 | — | — | — | 5 | — | — | — | — | 1.7 | Balance* | A | A | Example |
| 2 | 8.89 | — | 4 | — | — | 15 | 5 | — | — | 1 | 1 | 1.5 | — | — | — | 3 | — | — | — | — | 2.0 | Balance* | A | A | Example |
| 3 | 8.68 | — | — | 4 | — | 15 | 5 | — | — | 1 | 1 | 1 | — | — | — | 3 | — | — | — | — | 3.0 | Balance* | A | A | Example |
| 4 | 8.33 | — | — | — | 4 | 15 | 5 | — | — | 1 | 1 | 3 | — | — | — | 5 | — | — | — | — | 1.7 | Balance* | A | A | Example |
| 5 | 8.41 | 4 | — | — | — | 20 | — | 5 | — | 1 | 1 | 3 | — | — | — | 5 | — | — | — | — | 1.7 | Balance* | A | A | Example |
| 6 | 8.01 | 4 | — | — | — | 15 | 5 | — | — | 1 | 1 | 3 | — | — | — | 5 | — | — | — | — | 1.7 | Balance* | B | B | Example |
| 7 | 8.23 | 4 | — | — | — | 15 | 5 | — | — | 1 | 1 | 3 | — | — | — | 5 | — | — | — | — | 1.7 | Balance* | B | B | Example |
| 8 | 8.31 | 4 | — | — | — | 15 | 5 | — | — | 1 | 1 | 3 | — | — | — | — | 5 | — | — | — | 1.7 | Balance* | A | A | Example |
| 9 | 8.54 | 4 | — | — | — | 15 | 5 | — | — | 1 | 1 | 3 | — | — | — | — | — | 5 | — | — | 3.3 | Balance* | A | A | Example |
| 10 | 8.24 | 4 | — | — | — | 15 | 5 | — | — | 1 | 1 | 3 | — | — | — | — | — | — | 10 | — | 3.3 | Balance* | A | A | Example |
| 11 | 8.32 | 4 | — | — | — | 15 | 5 | — | — | 1 | 1 | 3 | — | — | — | 5 | — | — | 5 | — | 1.7 | Balance* | A | A | Example |
| 12 | 8.29 | 4 | — | — | — | 15 | 5 | — | — | 1 | 1 | 3 | — | — | — | 5 | — | — | — | 5 | 1.9 | Balance* | A | B | Example |
| 13 | 8.55 | 4 | — | — | — | 15 | 5 | — | — | 1 | 1 | 4 | — | — | — | 7.5 | — | — | — | — | 2.0 | Balance* | A | B | Example |
| 14 | 8.43 | 4 | — | — | — | 15 | 5 | — | — | 1 | 1 | 5 | — | — | — | 10 | — | — | — | — | 0.3 | Balance* | B | B | Example |
| 15 | 8.05 | 4 | — | — | — | 15 | 5 | — | — | 1 | 1 | 3 | — | — | — | 1 | — | — | — | — | 1.0 | Balance* | B | A | Example |
| 16 | 8.65 | 4 | — | — | — | 15 | 5 | — | — | 1 | 1 | 3 | — | — | — | 3 | — | — | — | — | 3.3 | Balance* | A | A | Example |
| 17 | 8.42 | 4 | — | — | — | 15 | 5 | — | — | 1 | 1 | 3 | — | — | — | 10 | — | — | — | — | 5.0 | Balance* | A | A | Example |
| 18 | 8.15 | 4 | — | — | — | 15 | 5 | — | — | 1 | 1 | 3 | — | — | — | 15 | — | — | — | — | 6.0 | Balance* | A | B | Example |
| 19 | 8.85 | 4 | — | — | — | 15 | 5 | — | — | 1 | 1 | 2 | 0.2 | — | — | 18 | — | — | — | — | 6.8 | Balance* | B | B | Example |
| 20 | 8.93 | 4 | — | — | — | 15 | 5 | — | — | 1 | 1 | 2 | — | 0.2 | — | 15 | — | — | — | — | 4.5 | Balance* | B | B | Example |
| 21 | 8.13 | 4 | — | — | — | 15 | 5 | — | — | 1 | 1 | 2 | 2 | — | — | 10 | — | — | — | — | 4.5 | Balance* | A | A | Example |
| 22 | 8.99 | 4 | — | — | — | 15 | 5 | — | — | 1 | 1 | — | — | — | 0.2 | 10 | — | — | — | — | 5.0 | Balance* | B | B | Example |
| 23 | 8.44 | 4 | — | — | — | 20 | — | — | — | 1 | 1 | 3 | — | — | — | — | — | — | — | 7.5 | — | Balance* | C | D | Comparative |
| 24 | 8.32 | 4 | — | — | — | — | — | — | 20 | 1 | 1 | 3 | — | — | — | — | — | — | — | 10 | — | Balance* | D | D | Comparative |

[Unit: % by mass];
Balance*: an amount to give 100% in total

As shown in Table 1, it is found that, in Examples using the specific amide compound, the effects of improving the low temperature ink stability and the ink ejection property after storage under low temperature are remarkably exhibited compare to Comparative Examples.

Image Formation Using Treatment Liquid

Preparation of Treatment Liquid 1

A treatment liquid 1 was prepared by mixing the components having the following composition. The pH (25° C.) of the treatment liquid 1 was set to 1.02. The pH was measured with a pH meter WM-50EG (manufactured by DKK-TOA Corporation) while controlling the temperature at 25° C.

Composition of Treatment Liquid 1

| | |
|---|---|
| Malonic acid (manufactured by Wako Pure Chemical Industries, Ltd.) | 25% |
| Diethylene glycol monomethyl ether (manufactured by Wako Pure Chemical Industries, Ltd.) | 20% |
| Emulgen P109 (manufactured by Kao Corporation; nonionic surfactant) | 1% |
| Ion-exchanged water | Balance to give 100% in total |

Image Formation

First, as shown in FIG. 1, the ink jet recording apparatus was prepared in which the treatment liquid application unit 12, having a treatment liquid ejection head 12S that ejects the treatment liquid; the treatment liquid drying zone 13 that dries the applied treatment liquid; the ink ejection unit 14 that ejects various ink compositions; the ink drying zone 15 at which the ejected ink composition is dried; and the ultraviolet irradiating unit 16 having the ultraviolet irradiating lamp 16S which is able to irradiate ultraviolet (UV) rays are arranged in this order in the conveyance direction of the recording medium (the direction of the arrow shown in the FIGURE).

The treatment liquid drying zone 13 is provided with an air blower (not shown in the FIGURE) for performing drying by blowing a dried air at the recording surface side of the recording medium and an infrared heater (not shown in the FIG-URE) at the non-recording surface side of the recording medium, and configured such that 70% or more of the water in the treatment liquid can be evaporated (dried) by adjusting the temperature and the air flow by the time when 900 msec has passed after the start of the application of the treatment liquid at the treatment liquid application unit. In the ink ejection unit 14, the black ink ejection head 30K, the cyan ink ejection head 30C, the magenta ink ejection head 30M, and the yellow ink ejection head 30Y are sequentially arranged in the conveyance direction (direction of the arrow). Each of the heads is in the form of full-line head (driving frequency: 25 kHz, conveyance speed of recording medium: 500 mm/s) of 1200 dpi (dot per inch)/10 inch width, which is capable of recording by ejecting each color in the main scanning direction in single-path manner.

The treatment liquid 1 obtained as above, the magenta ink (ink composition 1), the cyan ink (ink composition 2), and the yellow ink (ink composition 3) were sequentially filled into respective storage tanks (not shown) which were respectively connected to the treatment liquid ejection head 12S, the cyan ink ejection head 30C, the magenta ink ejection head 30M, and the yellow ink ejection head 30Y in the ink jet recording apparatus configured as shown in FIG. 1, and a solid image and a line image with 1200 dpi were formed on the recording medium.

Here, as the ink compositions 1 to 3, those having been stored at 5° C. for 14 days in the evaluation of "1. Stability over time of ink composition under low temperature" were used.

The application amount of the treatment liquid to the recording medium was set to 1.5 ml/m$^2$. As the recording medium, OK Top Coat+(basis weight: 104.7 g, manufactured by Oji Paper Co., Ltd.) was used.

When forming the image, each of the cyan ink, the magenta ink, and yellow ink was ejected from the ejection head with a resolution of 1200 dpi×1200 dpi, an ink droplet amount of from 2.5 pl to 3.6 pl, and a maximum ink application amount of 8 ml/m$^2$. The solid image was formed by ejecting the ink over the entire surface of a sample prepared by cutting the recording medium into A5 size.

Specifically, the image formation was performed under the following condition.

First, the treatment liquid was ejected to the recording medium as a single pass from the treatment liquid ejection head 12S, and then the treatment liquid was dried at the treatment liquid drying zone 13. At this time, the recording medium was conveyed such that it passed through the treatment liquid drying zone by the time when 900 msec had passed after the start of the ejection of the treatment liquid. In the treatment liquid drying zone 13, the applied treatment liquid was dried by blowing hot air of 120° C. to the recording surface at 5 msec for 5 seconds using the blower while heating the recording medium such that the film surface had a temperature of from 40° C. to 45° C. using the infrared heater at the back side (back surface) of the liquid applied surface. Subsequently, from the ejection heads 30C, 30M, and 30Y, which had been filled with the cyan ink, the magenta ink, and the yellow ink, the cyan ink, the magenta ink, and the yellow ink were ejected with a single pass, thereby forming an image. Thereafter, in the ink drying zone 15, the recording medium was similarly dried by blowing hot air of 120° C. to the recording surface at various flow rates using the blower while heating the recording medium using the infrared heater at the back side (back surface) of the ink applied surface. At this time, the conveyance speed was adjusted such that the duration of time from the application of the respective ink droplets on the recording medium to the start of drying the recording medium conveyed to the ink drying zone 15 was 1 second. After the drying of the image, the image was cured by UV light (metal halide lamp manufactured by Eye Graphics Co. Ltd. with a maximum irradiation wavelength of 365 nm) in the UV irradiating unit 16 at an irradiance of 1.5 W/cm$^2$ (the accumulative radiation amount was 0.75 J/cm$^2$) by controlling the electrical power of the light source and the conveyance speed.

The obtained image was fixed on the recording medium without the peeling of the image from the recording medium. It is conceivable that the polymerization initiator was not precipitated even after storing the ink composition at 5° C. for 14 days and contributed to the curing reaction of the polymerizable compound by UV irradiation, as a result of which the ink composition was sufficiently cured.

The disclosure of Japanese Patent Application No. 2012-214657 is incorporated herein by reference in its entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. An ink composition, comprising:
water;
a polymerizable compound;
a polymerization initiator; and a β-alkoxypropionamide compound represented by the following Formula (A):

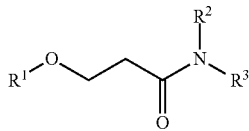

Formula (A)

wherein, in Formula (A), $R^1$ represents a linear or branched alkyl group having from 1 to 6 carbon atoms; each of $R^2$ and $R^3$ independently represents a hydrogen atom or a linear or branched alkyl group having from 1 to 4 carbon atoms; and $R^2$ and $R^3$ may be the same or different.

2. The ink composition according to claim 1, wherein a ratio (a/b) of the β-alkoxypropionamide compound (a) and the polymerization initiator (b) based on mass is from 1.7/1 to 5/1.

3. The ink composition according to claim 2, wherein a content of the β-alkoxypropionamide compound with respect to a total mass of the ink composition is from 3% by mass to 18% by mass.

4. The ink composition according to claim 3, having a pH of from 8 to 9.

5. The ink composition according to claim 4, further comprising a coloring agent.

6. The ink composition according to claim 5, wherein a content of the water with respect to a total mass of the ink composition is from 50% by mass to 70% by mass.

7. The ink composition according to claim 6, wherein the polymerizable compound is a (meth)acrylamide compound.

8. The ink composition according to claim 7, further comprising a polyvalent (meth)acrylamide compound represented by the following Formula (1):

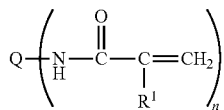

Formula (1)

wherein, in Formula (1), Q represents an n-valent linking group; $R^1$ represents a hydrogen atom or a methyl group; and n represents an integer of 2 or more.

9. The ink composition according to claim 8, which is an ink jet ink.

10. The ink composition according to claim 9, further comprising polymer particles and a surfactant.

11. The ink composition according to claim 1, wherein a content of the β-alkoxypropionamide compound with respect to a total mass of the ink composition is from 3% by mass to 18% by mass.

12. The ink composition according to claim 1, having a pH of from 8 to 9.

13. The ink composition according to claim 1, further comprising a coloring agent.

14. The ink composition according to claim 1, wherein a content of the water with respect to a total mass of the ink composition is from 50% by mass to 70% by mass.

15. The ink composition according to claim 1, wherein the polymerizable compound is a (meth)acrylamide compound.

16. The ink composition according to claim 1, further comprising a polyvalent (meth)acrylamide compound represented by the following Formula (1):

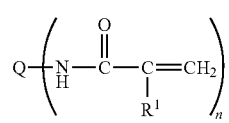

Formula (1)

wherein, in Formula (1), Q represents an n-valent linking group; $R^1$ represents a hydrogen atom or a methyl group; and n represents an integer of 2 or more.

17. The ink composition according to claim 1, which is an ink jet ink.

18. An image forming method, comprising applying the ink composition according to claim 17 to a recording medium by an ink jet method to form an image.

19. The image forming method according to claim 18, further comprising applying to the recording medium a treatment liquid comprising an aggregation component that forms an aggregate when brought into contact with the ink composition.

20. An ink set, comprising:
the ink composition according to claim 1; and
a treatment liquid comprising an aggregation component that forms an aggregate when brought into contact with the ink composition.

* * * * *